US010616084B2

(12) United States Patent
Hammerle et al.

(10) Patent No.: US 10,616,084 B2
(45) Date of Patent: Apr. 7, 2020

(54) NETWORK PACKET DE-DUPLICATION

(71) Applicant: ExtraHop Networks, Inc., Seattle, WA (US)

(72) Inventors: Eric Joseph Hammerle, Seattle, WA (US); Jesse Abraham Rothstein, Seattle, WA (US); Michael Kerber Krause Montague, Lake Forest Park, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 16/459,472

(22) Filed: Jul. 1, 2019

(65) Prior Publication Data
US 2019/0327156 A1    Oct. 24, 2019

Related U.S. Application Data

(63) Continuation of application No. 15/855,769, filed on Dec. 27, 2017, now Pat. No. 10,341,206.

(51) Int. Cl.
*H04L 12/26* (2006.01)
*H04L 29/06* (2006.01)
*H04L 29/08* (2006.01)
*H04L 12/24* (2006.01)

(52) U.S. Cl.
CPC .............. *H04L 43/08* (2013.01); *H04L 41/14* (2013.01); *H04L 43/028* (2013.01); *H04L 43/0847* (2013.01); *H04L 69/16* (2013.01); *H04L 69/22* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 8,457,127 | B2* | 6/2013 | Eastham | H04L 12/1886 370/390 |
| 2002/0133622 | A1* | 9/2002 | Pinto | H04L 41/12 709/242 |
| 2008/0279111 | A1 | 11/2008 | Atkins et al. | |
| 2013/0188645 | A1* | 7/2013 | Mack-Crane | H04L 12/4625 370/392 |

(Continued)

OTHER PUBLICATIONS

Office Communication for U.S. Appl. No. 15/855,769 dated May 1, 2019, pp. 1-20.

(Continued)

*Primary Examiner* — Anh Ngoc M Nguyen
(74) *Attorney, Agent, or Firm* — John W. Branch; Lowe Graham Jones PLLC

(57) ABSTRACT

Embodiments are directed to monitoring network traffic over a network. A monitoring engine may monitor flows of network packets in the network. The monitoring engine may determine an observation port that provided the network packets. The monitoring engine may determine primary network packets provided by an authoritative observation port based on which observation port provided the network packets and provide them to an analysis engine. The monitoring engine may discard a remainder of the network packets that may be associated with non-authoritative observation ports. The analysis engine may analyze the one or more primary network packets.

17 Claims, 15 Drawing Sheets

(56) References Cited

U.S. PATENT DOCUMENTS

| | | |
|---|---|---|
| 2015/0074258 A1 | 3/2015 | Ferreira et al. |
| 2016/0285752 A1* | 9/2016 | Joshi ................... H04L 45/302 |
| 2016/0380885 A1 | 12/2016 | Jani et al. |
| 2018/0131711 A1* | 5/2018 | Chen ................... H04L 43/026 |

OTHER PUBLICATIONS

Office Communication for U.S. Appl. No. 15/855,769 dated Feb. 5, 2019, pp. 1-21.

\* cited by examiner

NETWORK PACKET DE-DUPLICATION

CROSS-REFERENCE TO RELATED APPLICATION(S)

This Utility patent application is a Continuation of U.S. patent application Ser. No. 15/855,769 filed on Dec. 27, 2017, now U.S. Pat. No. 10,341,206 issued on Jul. 2, 2019, the benefit of which is claimed under 35 U.S.C. § 120, and the contents of which is further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor. In some network environments, network traffic monitors may be exposed to the network traffic from different parts of a network where the network traffic is essentially duplicated because the "same" network packet occurs in different parts of a network. Such duplicated network packets may interfere with analysis of monitored networks or the collection or computation of network monitoring metrics (e.g., various forms of double counting). Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
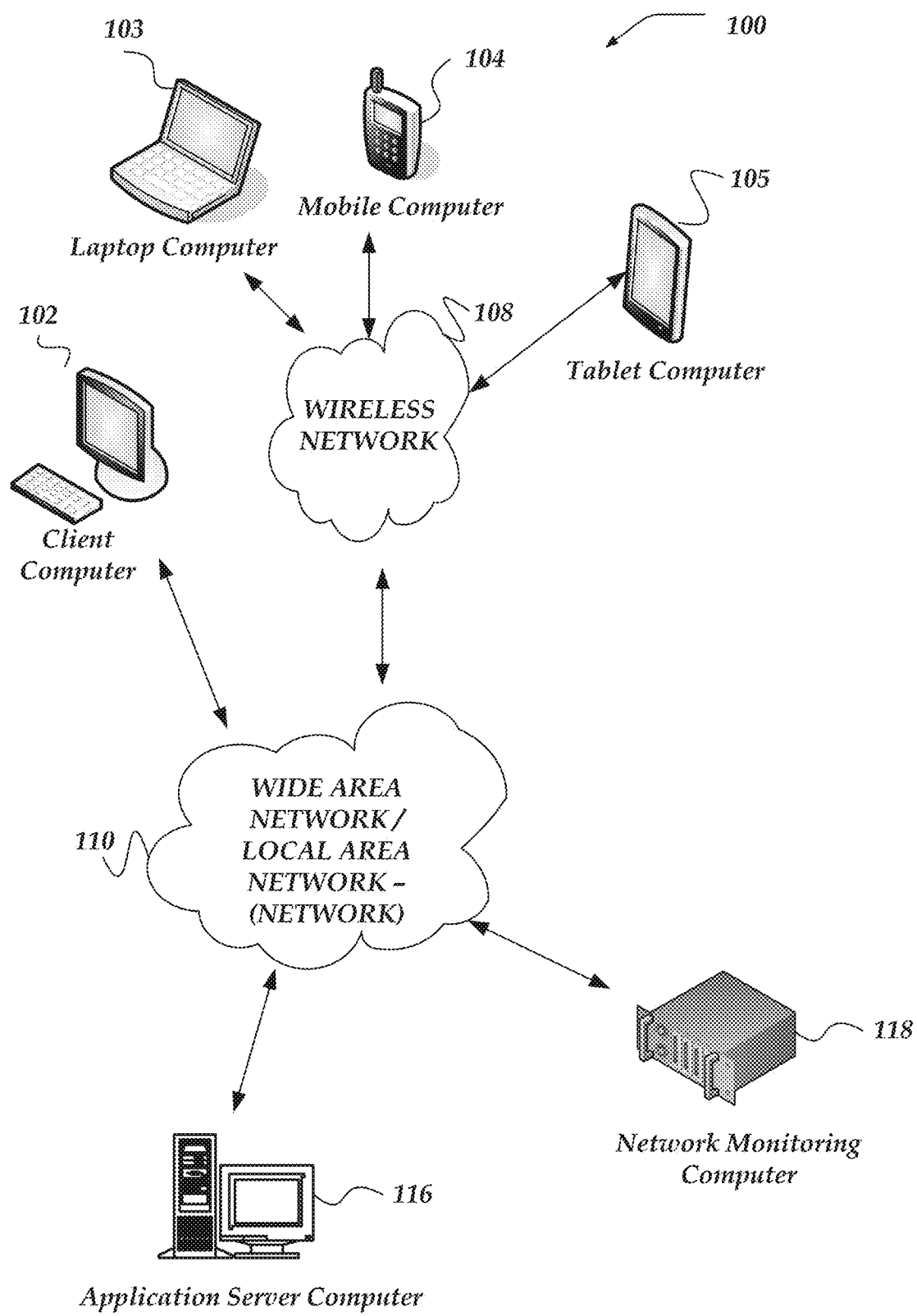
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In one or more of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, inter-networking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from four to seven, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the "device profile" refers to a data structure that represents the characteristics of network devices that are discovered in networks monitored by NMCs. Values or fields in device profiles may be based on metrics, network traffic characteristics, network footprints, or the like, that have been collected based on passive network monitoring of network traffic in one or more monitored networks. Device profiles may be provided for various network devices, such as, client computers, server computers, application server computers, networked storage devices, routers, switches, firewalls, virtual machines, cloud instances, or the like.

As used herein, the "application profile" refers to a data structure that represents the characteristics of applications or services that are discovered in networks monitored by NMCs. Values or fields in application profiles may be based on metrics, network traffic characteristics, network footprints, or the like, that have been collected based on passive network monitoring of network traffic in one or more monitored networks. Application profiles may be provided for various applications, such as, client computers, server computers, application server computers, networked storage devices, routers, switches, firewalls, virtual machines, cloud instances, or the like. For example, application profiles may be provided for web clients, web servers, database clients, database servers, credentialing services, mobile application clients, payment processors, groupware clients, groupware services, micro-services, container based services, document management clients, document management services, billing/invoicing systems, building management services, healthcare management services, VOIP clients, VOIP servers, or the like.

As used herein, the term "entity profile" refers to a data structure that represent the characteristics of a network entity that may be a combination of device profiles and application profiles. Entity profiles may also include additional values or fields based on metrics, network traffic characteristics, network footprint, or the like, that have been collected based on passive network monitoring of network traffic in one or more monitored networks. For example, an entity profile may be provided for application servers where the entity profile is made from some or all of the device profile of the computer running or hosting the applications and some or all of the application profiles associated with the applications or services that are running or hosting one the computer. In some cases, multiple services or applications running on devices may be included in the same entity profile. In other cases, entity profiles may be arranged in hierarchal data structure similar to an object oriented computer languages class hierarchy.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term "authoritative observation port" refers to an observation port that has been determined or designated to be the authoritative source of network packets for a network flow. In cases, where duplicate network packets for the same flow are provided to an NMC by two or more observation ports, packets provided by the authoritative observation port for a given network flow may be determined to the primary network packets while the network packets provided by other observation ports may be considered duplicate network packets.

As used herein, the term "non-authoritative observation port" refers to an observation port that for a given network flow is not the authoritative observation port. Note, an observation port may be authoritative for some network flows and non-authoritative for other network flows depending on the circumstances, As used herein, the term "primary network packets" refers to network packets for a network flow that are provided by an authoritative observation port. The term is used to distinguish between network packets provided by authoritative observation ports and non-authoritative observation ports associated with the same network flow.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic over a network using one or more network monitoring computers (NMCs) to perform actions described below. In one or more of the various embodiments, the NMC may be arranged to employ a monitoring engine to monitor one or more flows of network packets based on one or more network packets. In one or more of the various embodiments, the NMC may be arranged to employ the monitoring engine to determine an observation port that may provide the network packets based on one or more characteristics of the network packets or one or more characteristics of the observation port. In one or more of the various embodiments, determining the observation port, may include, associating the observation port with a flow based on a path used by the one or more network packets on the network. In one or more of the various embodiments, the NMC may be arranged to employ a monitoring engine to determine one or more primary network packets that may be provided by an authoritative observation port based on the observation port that provided the network packets such that the one or more primary network packets may be provided to an analysis engine.

In one or more of the various embodiments, the NMC may be arranged to employ a monitoring engine to discard a remainder of the network packets that may be associated with non-authoritative observation ports. In one or more of the various embodiments, the NMC may be arranged to employ the analysis engine to analyze one or more primary network packets.

In one or more of the various embodiments, the NMC may be arranged to employ a monitoring engine to assign the authoritative observation port for the one or more network flows based on one or more characteristics of the network packets associated with the one or more network flows such that the authoritative observation port may be selected from one or more observation ports.

In one or more of the various embodiments, the NMC may be arranged to employ a monitoring engine to identify one or more network devices in the network based on one or more characteristics of one or more flows of network packets. And, identifying the one or more of the network devices as being observation ports based on one or more metrics that indicate that the one or more identified network devices perform one or more routing actions.

In one or more of the various embodiments, the NMC may be arranged to employ a monitoring engine to monitor Open System Interconnection (OSI) Layer 2 characteristics of the one or more network packets. The monitoring engine may insert tag information into the OSI Layer 2 header of the one or more network packets based on the determined observation port. And, the monitoring engine may determine the observation port associated with the network packets based on the tag information.

In one or more of the various embodiments, the NMC may be arranged to employ a monitoring engine to assign the authoritative observation port to a different observation port based on one or more observed changes in the one or more characteristics of the one or more flows of network packets.

In one or more of the various embodiments, the NMC may be arranged to employ a monitoring engine to compare one or more duplicate network packets associated with a same flow based on one or more metrics, hop counts, time to live (TTL) values, or latency values. And, determine one or more metrics on a per flow basis based on the comparison of the one or more duplicate network packets.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, coupling network monitoring computer 118 with application server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations and/or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
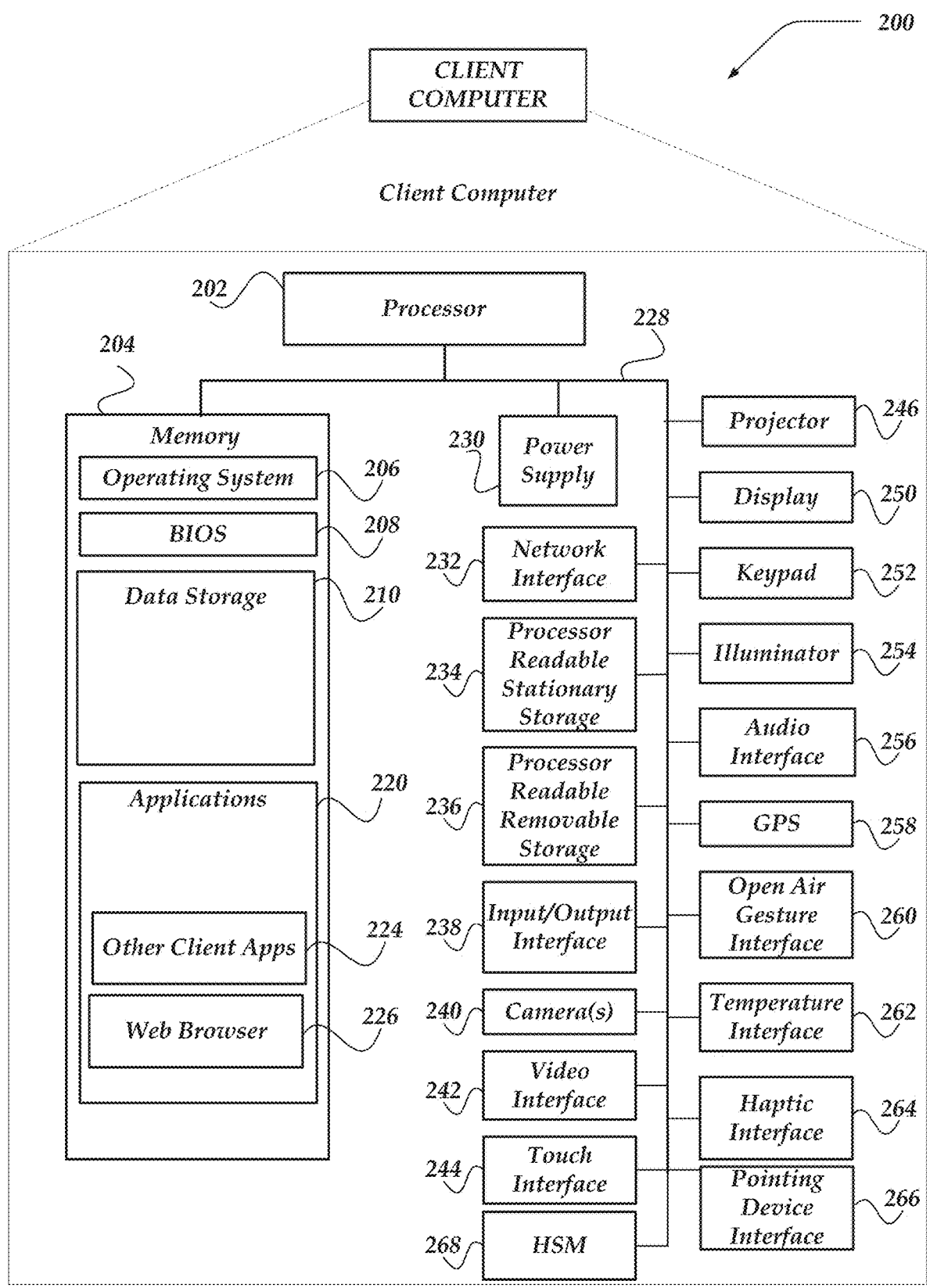
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
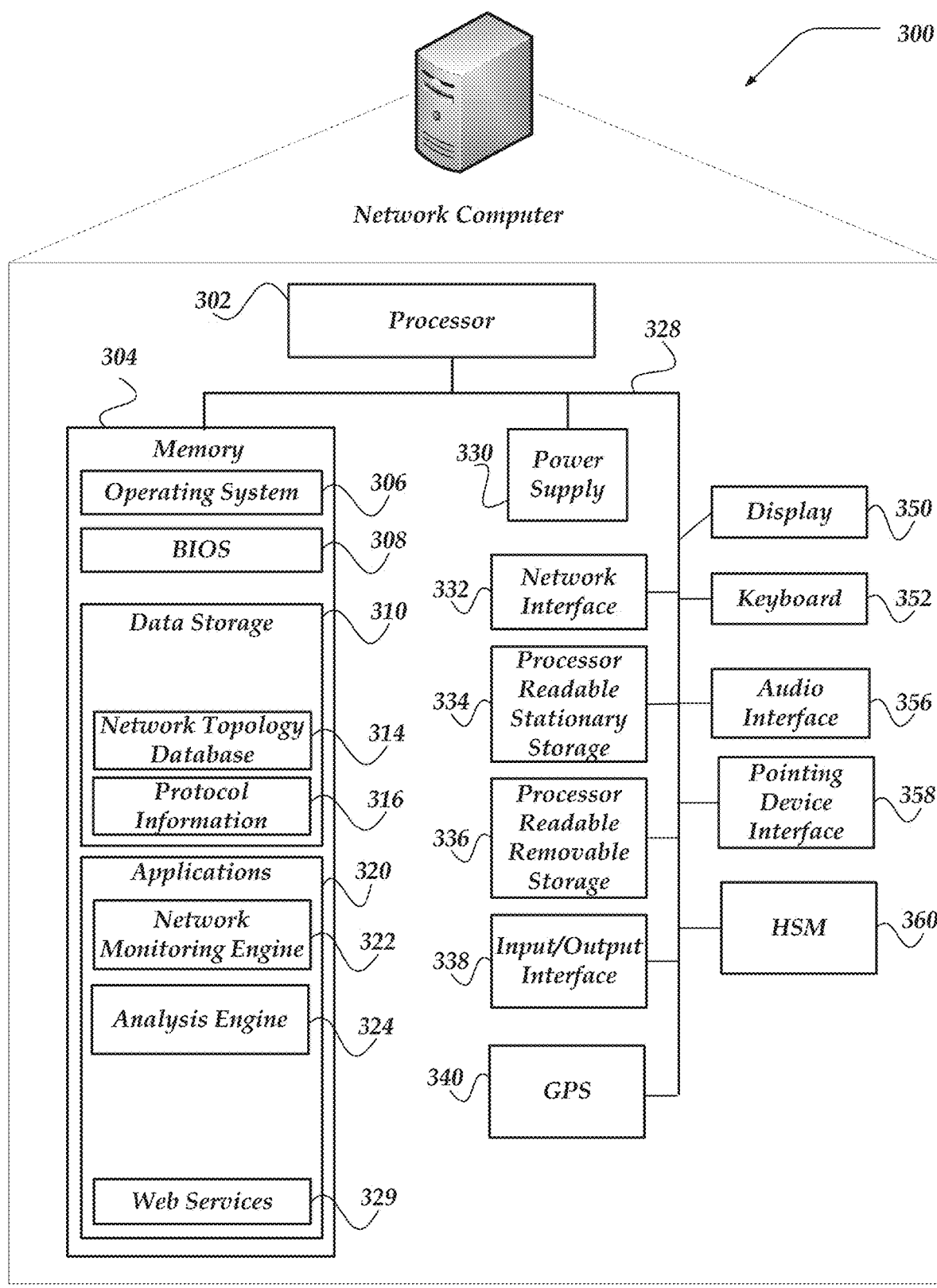
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, or the like. Network topology database 314 may be a data store that contains information related to the topology of one or more network monitored by a NMC. And, protocol information 316 may store various rules and/or configuration information related to one or more network communication protocols, including application protocols, secure communication protocols, client-server protocols, peer-to-peer protocols, shared file system protocols, or the like, that may be employed in a monitored network environment.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, analysis engine 324, web services 329, or the like, that may be arranged to perform actions for embodiments described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, network monitoring engine 322, analysis engine 324, web services 329, or the like, may be operative in a cloud-based computing environment. In one or more of the various embodiments, these applications, and others, that comprise the management platform may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to network monitoring engine 322, analysis engine 324, web services 329, or the like, may be provisioned and de-commissioned automatically.

Also, in one or more of the various embodiments, network monitoring engine 322, analysis engine 324 web services 329, or the like, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
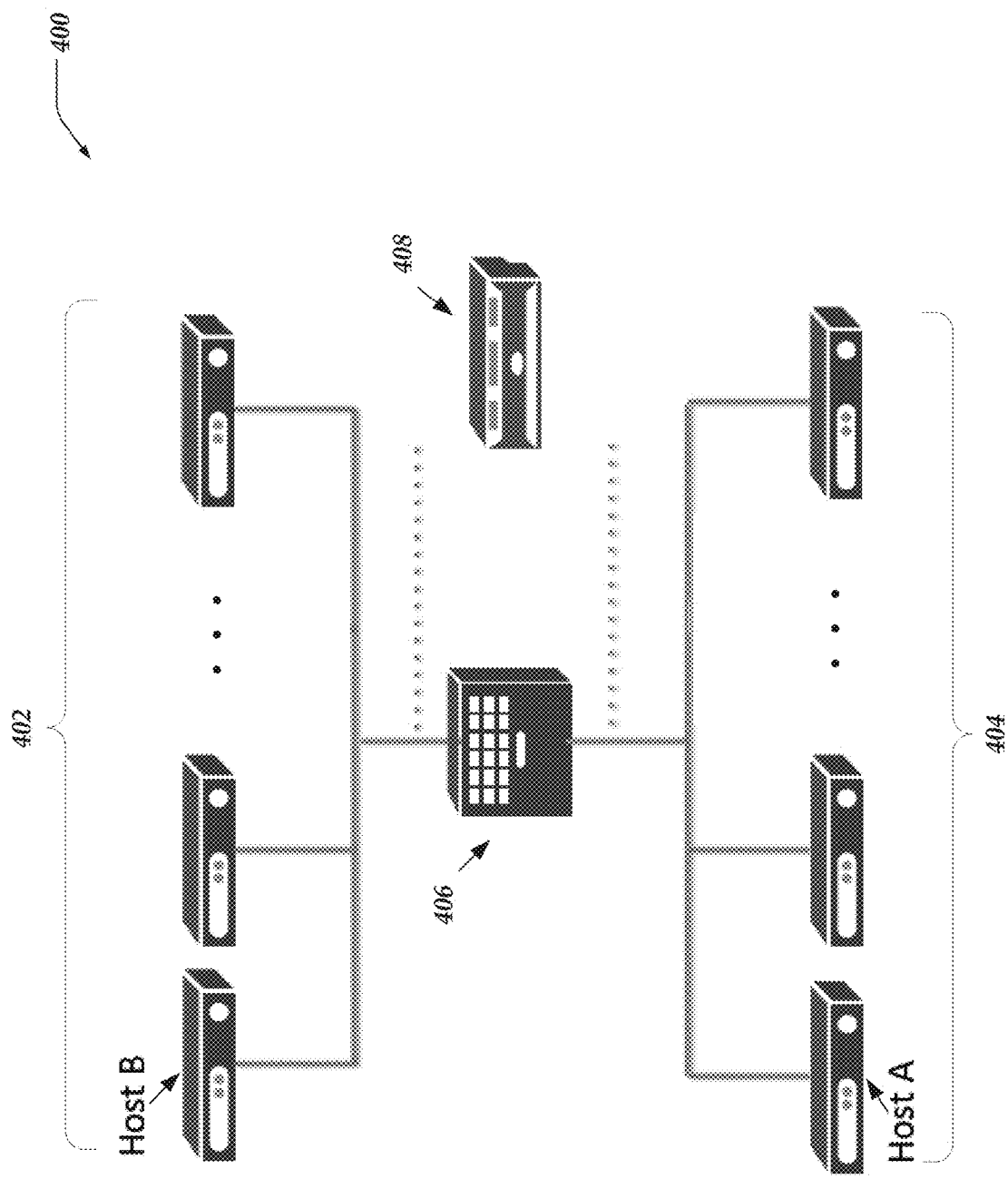
FIG. 4 illustrates a logical architecture of a system for network packet de-duplication in accordance with one or more of the various embodiments.

FIG. 4 illustrates a logical architecture of system 400 for network packet de-duplication in accordance with one or more of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In one or more of the various embodiments, wire traffic from one or more networks may be provided to an NMC via one or more SPAN aggregators that are arranged to provide mirrored to separate input ports corresponding to different physical or logical portions of one or more networks. In other embodiments, mirrored wire traffic from one or more monitored networks may be provided to the NMC over a single port. In general, NMCs may be arranged to receive mirrored network traffic (e.g., wire traffic) from more than one location in the monitored networks. Accordingly, in one or more of the various embodiments, each of these locations may be considered an observation port.

In one or more of the various embodiments, different or separate observation ports may provide duplicate network traffic to an NMC. For example, as network traffic flows through different parts of a network it may be monitored at two or more different observation ports. In many cases, such duplicate network traffic may make it difficult to analyze network behavior or compute network metrics. Accordingly, in some embodiments, as described in more detail below, NMCs may be arranged perform one or more actions to identify duplicate network traffic to improve network analysis, performance metric collection, packet capture, or the like, or combination thereof.

Figure 5:
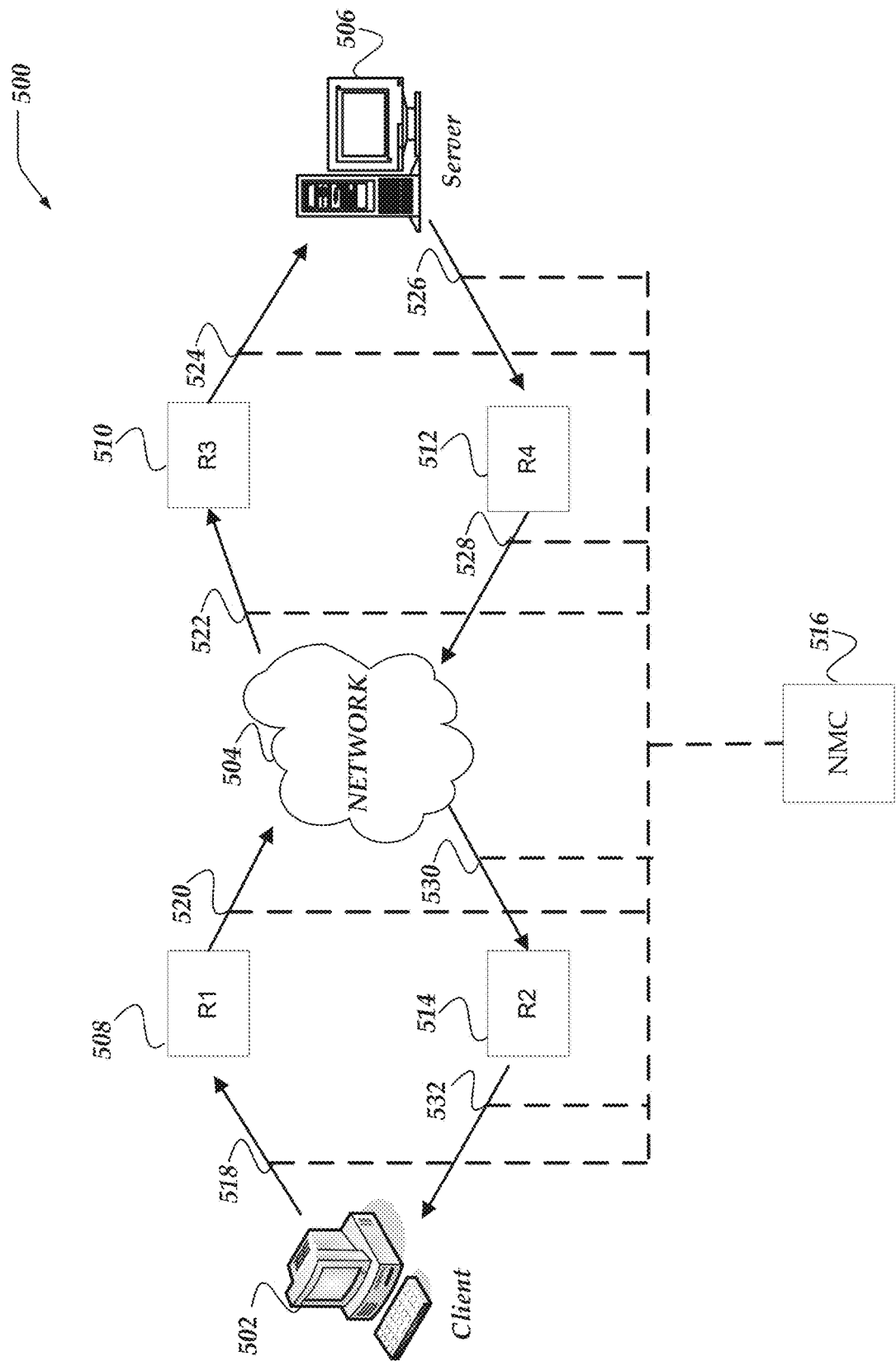
FIG. 5 illustrates a logical architecture of a system for network packet de-duplication in accordance with one or more of the various embodiments.

FIG. 5 illustrates a logical architecture of system 500 for network packet de-duplication in accordance with one or more of the various embodiments. In one or more of the various embodiments, system 500 includes client 502 that is communicating over network 504 with server 506. In some embodiments, network traffic from client 502 may travel over different parts of a network to reach server 506. In this example, inbound traffic from client 502 may first arrive at router 508 (R1). From there, in this example, the inbound traffic may be forwarded over one or more hops through other network devices or network computers, including other routers or switches, comprising network 504. Continuing with this example, the inbound traffic may reach router 510 (R3) before arriving at server 506.

Likewise, in some embodiments, in this example, server 506 may be arranged to send outbound traffic to client 502. The outbound traffic may be a response to a client request or it may be a server initiated communication associated with one or more applications, services, systems, or the like, hosted on server 506. In general, the outbound traffic may travel through various network portions (e.g., network segments or sub-networks) until it reaches client 502. In this example, the outbound traffic may first reach router 512 (R4), then network 504, then router 514 (R2) before reaching client 502.

As discussed above, in one or more of the various embodiments, one or more network monitoring computers (NMCs), such as NMC 516 may be arranged to passively monitor the network traffic flowing through system 500. In this example, for some embodiments, NMC 516 may be arranged to employ one or more observation ports that provide mirrored network traffic that passed through one or more segment or portions of system 500.

In this example, for some embodiments, observation ports are represented by observation port 518, observation port 520, observation port 522, observation port 524, observation port 526, observation port 528, observation port 530, and observation port 532. Observation ports represent various places in system 500 where mirrored network traffic may be provided to NMC 516. In some embodiments, the particular mechanism used for as a observation port may vary depending the particular network topology or network technology as discussed above with FIG. 4. In one or more of the various embodiments, observation port 518, observation port 520, observation port 522, and observation port 524 represent observation ports that may be monitoring inbound traffic while observation port 526, observation port 528, observation port 530, and observation port 532 represent observation ports that may be monitoring outbound traffic.

In one or more of the various embodiments, observation ports may provide network traffic to an NMC, such as NMC 516. In some embodiments, two or more observation ports may provide network packets from different portions of the network that may be duplicates created when the same packets are forwarded from one network portion to another. For example, if client 502 sends a request directed to server 506, observation port 518, observation port 520, observation port 522, and observation port 524 may each provide network traffic to NMC 516 that corresponds to the same request sent by client 502. Likewise, in one or more of the various embodiments, if server 506 sends a response to client 502, observation port 526, observation port 528, observation port 530, and observation port 532 may each provide network traffic to NMC 516 that corresponds to the same response sent by server 506.

Accordingly, in one or more of the various embodiments, NMCs, such as NMC 506 may be required to identify network traffic provided by different observation ports that actually represents the same communication, messages, request, response, or the like. Otherwise, in some embodiments, accurate analysis of the network traffic or network behavior may be difficult or impossible. At least one way to handle duplicate or same traffic provided by different observation ports may be to identify duplicate traffic or duplicate network packets and perform de-duplication to exclude duplicated traffic from being included in analysis of the network. For example, in some embodiments, duplicate network packets may be discarded with the remaining (non-duplicate) packets used to analyze the network. In one or more of the various embodiments, if duplicate network traffic is discarded, analysis engines, such as, analysis engine 324 may be provided the non-duplicate traffic to effectively analyze network behavior or network characteristics.

However, in one or more of the various embodiments, even though some network traffic provided by two or more observation ports is referred here duplicate traffic, the network packets comprising the duplicate traffic may not be identical. In some embodiments, network packets may be modified as they travel through different network portions. For example, routers may routinely modify one or more source and destination fields of network packets as they flow through a network towards their ultimate destination. Likewise, other devices, such as, firewalls, proxy devices/services, network address translation (NAT) services, load balancers, or the like, or combination thereof, may modify protocol header fields, including source/destination addresses, sequence numbers, tags, QOS flags, or the like, or combination. In most cases, such modifications are expected in the course of normal network operations that do not negatively impact the operation of the network or the services it is hosting or supporting. Though, in some cases, some modifications to network packets may be caused by misconfiguration or other unexpected reasons.

Accordingly, in some embodiments, network packets that represent duplicate network traffic are unlikely to be identical making simplistic comparison tests unreliable. While, in some embodiments, NMCs may be arranged to perform various heuristics to identify duplicate network traffic the innovation herein improve by reducing the chance for false positive or missed duplicates.

In one or more of the various embodiments, because duplicate traffic may be caused by two or more observation ports providing the same monitored, mirrored or copied traffic to an NMC, the NMC may be arranged to designate one of the observation ports as an authoritative observation port. Network packets provided by authoritative observation ports may be considered primary network packets for monitored network flows. Network traffic provided by observation ports other than the authoritative observation port may be considered duplicate network packets for a network flow.

In one or more of the various embodiments, authoritative observation ports may be designated on a per network flow or per connection basis. Accordingly, in one or more of the various embodiments, different network flows may have different authoritative observation ports depending on how their traffic may be routed through a network.

In one or more of the various embodiments, NMCs may be arranged to designate authoritative observation ports based various characteristics of the network or the network traffic. In some embodiments, the observation port closest to a point of interest in the network may be designated an authoritative observation port. For example, in one or more of the various embodiments, if server response time independent of network latency is of interest observation ports closest to the server may be designated as authoritative observation ports. Likewise, in some embodiments, if response characteristics of the entire round trip of a client is important to measure, observation ports closest to the client may be designated as authoritative observation ports.

Further, in one or more of the various embodiments, two or more observation ports may be designated as authoritative observation ports for the same network flow. Accordingly, in one or more of the various embodiments, the network packets collected by each authoritative observation port may be analyzed independently.

Also, in one or more of the various embodiments, rather than designating authoritative observation ports, two or more observation ports may be used to individually track characteristics or performance related to how different parts of a network may be performing. Accordingly, in one or more of the various embodiments, an NMC may be arranged to associate network packets of the same network flow with the observation port that provided them. Thus, in some embodiments, the NMC may be arranged to compare the characteristics of the same network flow in different portions of the network.

Note, in one or more of the various embodiments, while the network packets collected by the different observation ports for the same flow may be considered duplicate traffic, maintaining an association of those duplicate packets with the observation port that provided them enables the analysis engine to distinguish between them. Accordingly, in one or more of the various embodiments, the analysis engine may be arranged to measure changes in traffic characteristics as the traffic flows through different parts of the network.

In one or more of the various embodiments, NMCs may be arranged to identify the observation port based on one or more characteristics or values of the network traffic it provides. In one or more of the various embodiments, the particular key fields or values used for associating network packets with observation ports may vary depending on the network protocol, observation/monitoring mechanism, position of the observation port in the network, or the like, or combination thereof. For example, in one or more of the various embodiments, fields such as, source address, destination address, or the like, may be used to associate a network packet with a given observation port. Thus, for example, network packets in a network flow having a destination of a network interface on router 512 (R4) and a source address of server 506, may be considered associated with observation port 526. Likewise, for example, network packets for the same network flow having a destination of a network interface on client 502 and a source address of router 532, may be considered associated with observation port 532.

In one or more of the various embodiments, for brevity and clarity, network devices, such as router 508, router 510, router 512, and router 514 are referred to as routers. While, in some embodiments, routers may be a common application of these innovations, these innovations are not so limited. In some embodiments, there may be other network devices, such as, firewalls, proxy devices/services, network address translation (NAT) services, gateways, load balancers, switches, or the like, or combination thereof, that may modify protocol header fields, including source or destination addresses, sequence numbers, tags, QOS flags, or the like, or combination. For brevity and clarity such devices may be described as routers with respect to observation ports, authoritative observation ports, duplicate traffic production, or the like. This broad notion of routers is generally maintained throughout this document.

Figure 6:
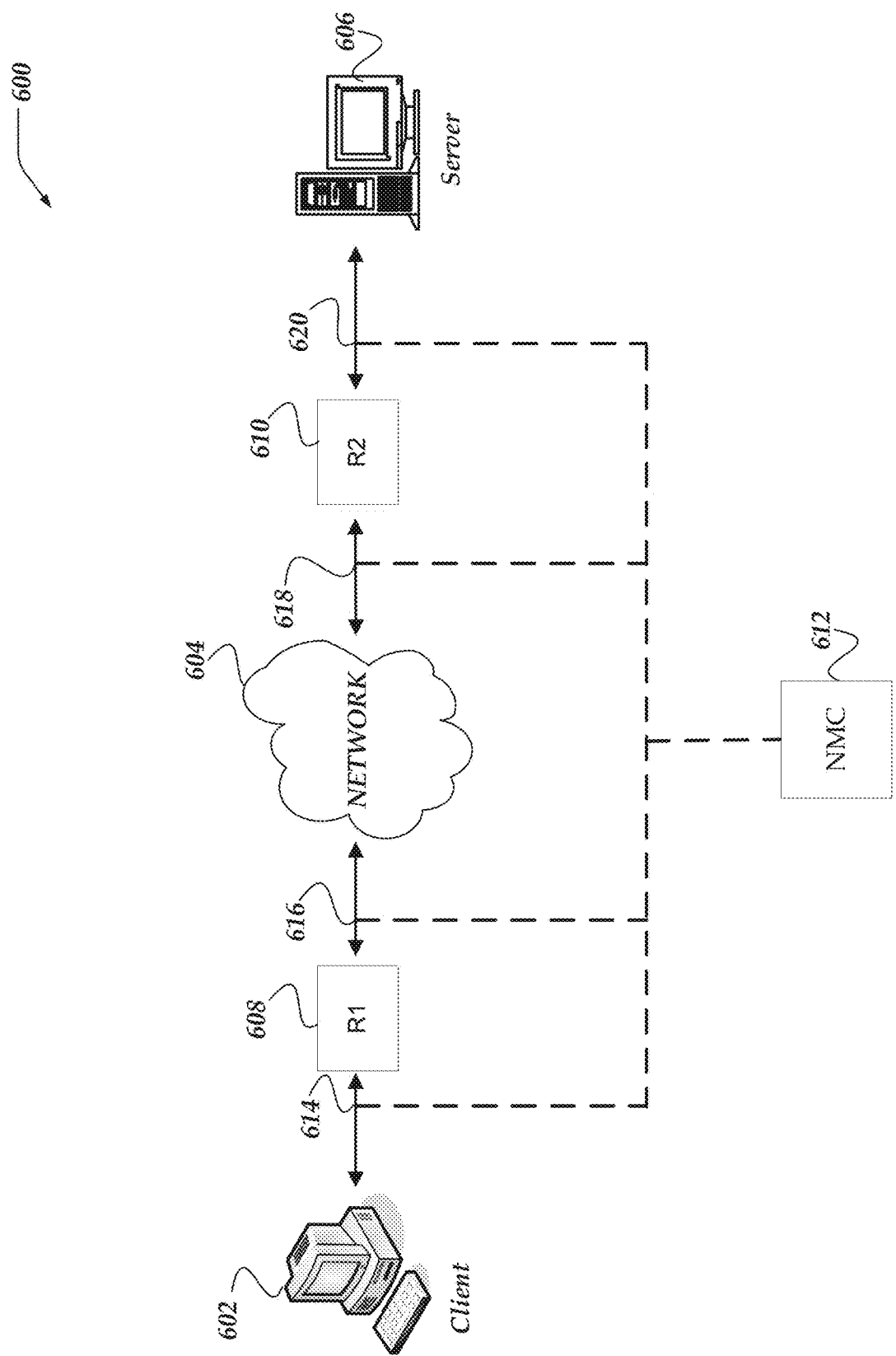
FIG. 6 illustrates a logical architecture of a system for network packet de-duplication in accordance with one or more of the various embodiments.

FIG. 6 illustrates a logical architecture of system 600 for network packet de-duplication in accordance with one or more of the various embodiments. In one or more of the various embodiments, system 600 may include client 602, network 604, server 606, router 608 (R1), router 610 (R2), NMC 612, observation port 614, observation port 616, observation port 618, and observation port 620. In one or more of the various embodiments, system 600 may be considered similar to system 500 as described above, however the network traffic is represented as bi-directional network flows (e.g., connections) where network packets for both directions of communication may be sent over the same network path. Likewise, in one or more of the various embodiments, the observation ports may be considered to observe both directions of the network traffic of a network flow. However, in some embodiments, for the purposes of analysis, each direction may be treated as separate unidirectional flows. Likewise, in some embodiments, two unidirectional flows of may be considered to be related flows or they may be considered a single connection or bidirectional flow. Thus, in one or more of the various embodiments, an NMC may be arranged to include an analysis engine that may be arranged to conduct its analysis accordingly.

Figure 7:
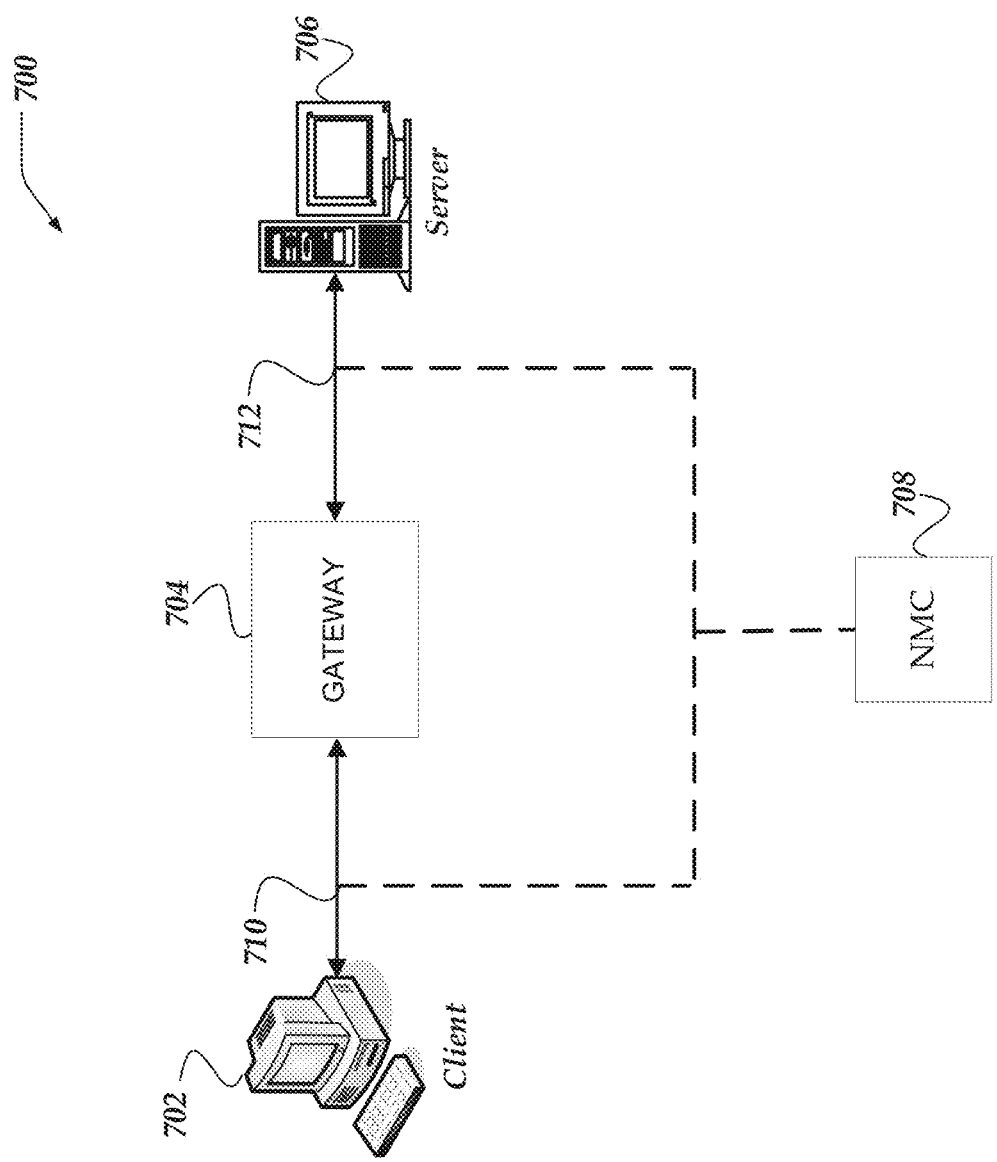
FIG. 7 illustrates a logical architecture of a system for network packet de-duplication in accordance with one or more of the various embodiments.

FIG. 7 illustrates a logical architecture of system 700 for network packet de-duplication in accordance with one or more of the various embodiments. In one or more of the various embodiments, system 700 may include client 702, gateway 704, server 706, NMC 708, observation port 710, and observation port 712. In one or more of the various embodiments, system 700 may be considered similar to system 500 and system 600 as described above, however the network traffic is represented going through a single gateway computer rather than making multiple hops through different network portions to reach server 706. However, in one or more of the various embodiments, network traffic between client 702 and gateway 704 may be associated with observation port 710 and the network traffic between gateway 704 and server 706 may be associated with observation port 712.

Figure 8:
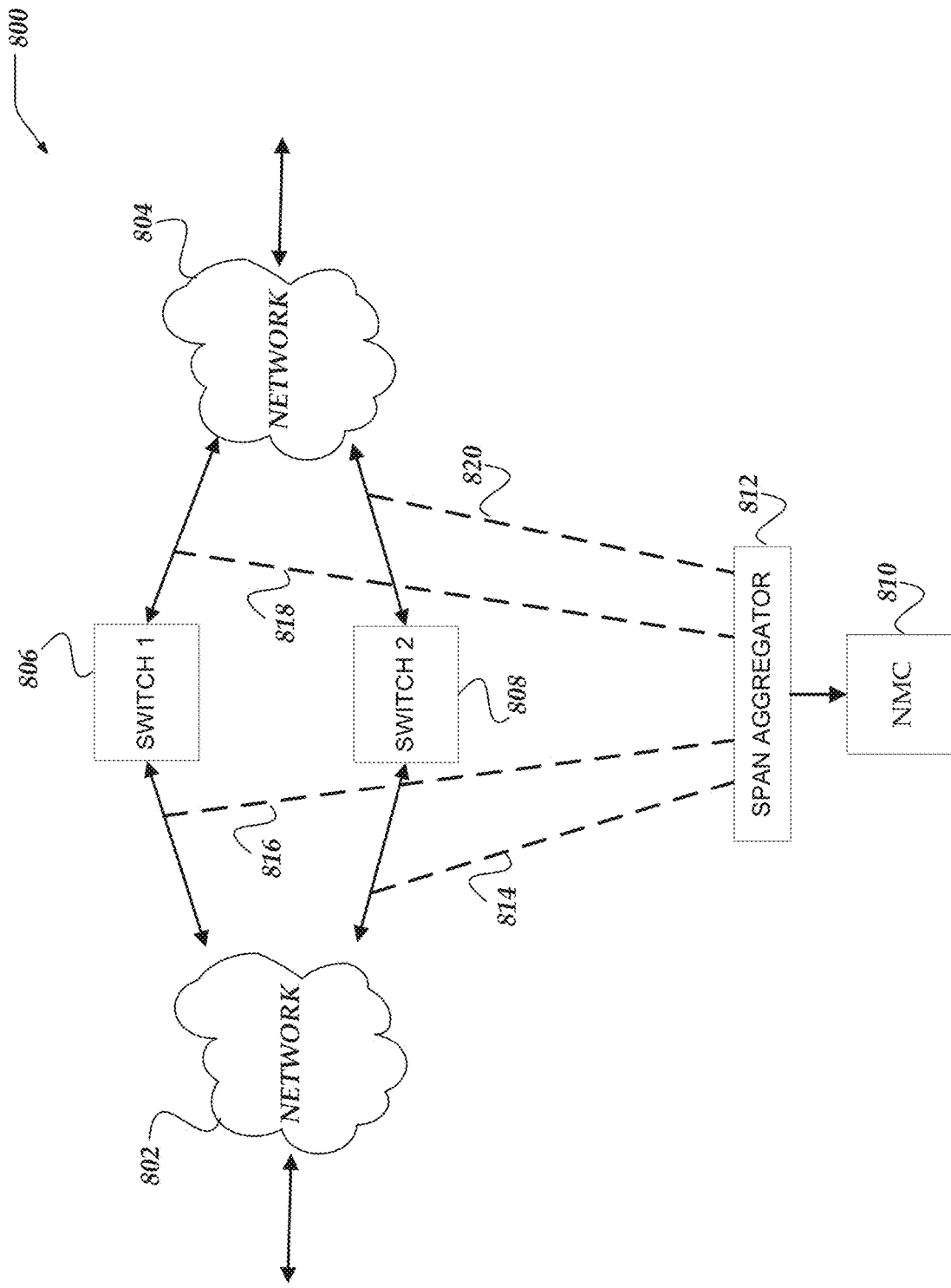
FIG. 8 illustrates a logical architecture of a system for network packet de-duplication in accordance with one or more of the various embodiments.

FIG. 8 illustrates a logical architecture of system 800 for network packet de-duplication in accordance with one or more of the various embodiments. In one or more of the various embodiments, system 800 includes network 802, network 804, switch 806, switch 808, NMC 810, SPAN aggregator 812, observation port 814, observation port 816, observation port 818, and observation port 820. In one or more of the various embodiments, system 800 may be considered similar to system 500, system 600, and system 700 as described above, however, while those systems are generally illustrated as using OSI Layer 3 (or above) information to identify network flows or to associate network flows with observation ports, system 800 represents an NMC that may be arranged to employ OSI Layer 2 information for associating network traffic or flows with observation ports.

In one or more of the various embodiments, some or all of the observation ports used by an NMC, such as, NMC 810 may be routed through different ports of a SPAN aggregator, such as, SPAN aggregator 812. Accordingly, in one or more of the various embodiments, the SPAN aggregator may be arranged into tags into the network packets that identify the port associated with the observation port that collected the network traffic. Accordingly, in one or more of the various embodiments, authoritative observation ports may be designated based on the tag injected by the SPAN aggregator. In one or more of the various embodiments, the tag may be injected into an existing fields of a Layer 2 header, such as, VLAN tag fields of an Ethernet header. In other embodiments, the tags information may be injected into non-standard or custom locations in a packet. Likewise, in some embodiments, tag information may be appended or prepended to packets at designated locations. For example, in some embodiments, tag information may be prepended to the Layer 2 Ethernet header.

Accordingly, in one or more of the various embodiments, the tag information may be used to identify duplicate network traffic that should be discarded. Or, in one or more of the various embodiments, the tag information may be used to perform analysis of network traffic on a per observation port basis. Likewise, in one or more of the various embodiments, the tag information may be used to perform analysis of network traffic that compares characteristics of network traffic occurring or measured at different observation ports.

In one or more of the various embodiments, an NMC, such as, NMC 810 may be arranged to include a SPAN aggregator as a built-in component. In other embodiments, SPAN aggregators may be separate network devices.

Figure 9:
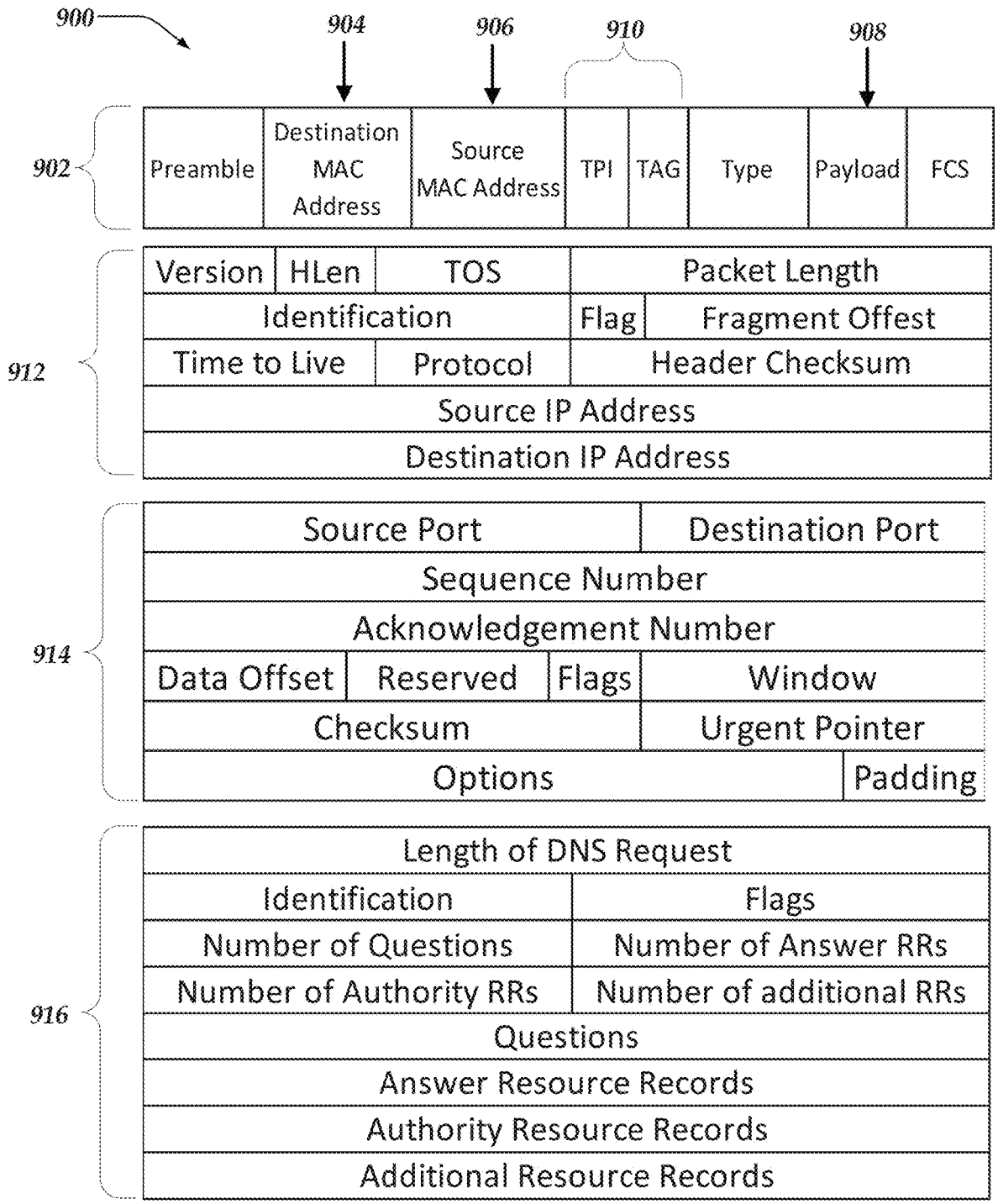
FIG. 9 illustrates a logical data structure for a network packet that is in accordance with one or more of the various embodiments.

FIG. 9 illustrates a logical data structure for network packet 900 that is in accordance with one or more of the various embodiments. Packet 900 represent a DNS packet format that may be used for name service queries and replies using TCP/IP. In one or more of the various embodiments, packet 900 may comprise Ethernet frame 902 that includes the entire packet.

In one or more of the various embodiments, Ethernet Frame 902 may include various fields that as specified by the version of protocol being used. In this example, field 904 includes the destination MAC address, field 906 includes the source MAC address, field 908 includes the payload (or data) of frame. In this example, IP header 912, TCP header 914, and DNS payload 916.

Also, in some embodiments, frame 902 may be arranged to include fields for VLAN tag information, such as fields 910. In one or more of the various embodiments, NMCs may be arranged to use VLAN tag information for associating network traffic with observation ports.

In one or more of the various embodiments, if describing duplicate packets it usually means that payload 916 is the same for packets of the same unidirectional flow provided by to an NMC by different observation ports. In some embodiments, TCP header 914 may be the same for duplicate packets of a unidirectional flow, but in some cases, one or more network devices, network computers, network services disposed between the clients and servers (e.g., any two endpoints in a network) may modify one or more fields of TCP header depending on their roles or configuration. Likewise, in one or more of the various embodiments, IP header 912 may be modified by one or more intervening network devices, network computers, network services, or the like, such that one or more field values for IP headers for the same payload of a flow (e.g., duplicate packets) may be different depending on the observation port that provides the network traffic to the NMC.

In one or more of the various embodiments, if the modifications made by the one or more intervening network devices, network computers, network services, or the like, that may make it difficult for duplicate packets to be easily identified.

Generalized Operations

FIGS. 10-15 represent generalized operations for network packet de-duplication in accordance with one or more of the various embodiments. In one or more of the various embodiments, processes 1000, 1100, 1200, 1300, 1400, and 1500 described in conjunction with FIGS. 10-15 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-15 may be used for real-time configuration discovery and management in accordance with at least one of the various embodiments and/or architectures such as those described in conjunction with FIGS. 4-9. Further, in one or more of the various embodiments, some or all of the actions performed by processes 1000, 1100, 1200, 1300, 1400, and 1500 may be executed in part by network monitoring engine 322, or analysis engine 324 running on one or more processors of one or more network computers.

Figure 10:
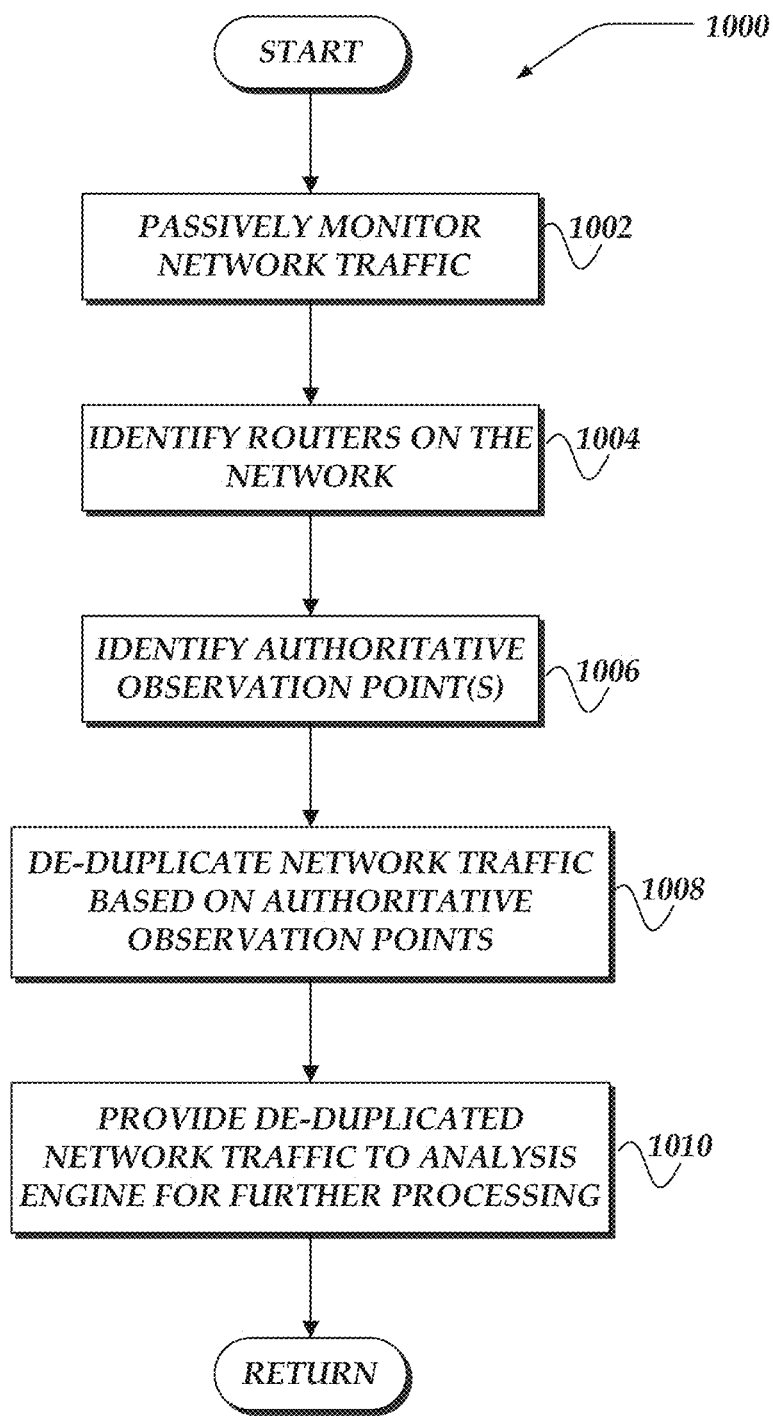
FIG. 10 illustrates an overview flowchart of a process for network packet de-duplication in accordance with one or more of the various embodiments.

FIG. 10 illustrates an overview flowchart of process 1000 for network packet de-duplication in accordance with one or more of the various embodiments. After a start block, at block 1002, in one or more of the various embodiments, one or more NMCs may be arranged to passively monitory network traffic occurring in one or more networks. As described above, in FIGS. 4-8, NMCs may be arranged to monitor network traffic that may be flowing through different parts of a network. In one or more of the various embodiments, network traffic may be provided over one or more observation ports that each provide network traffic to the one or more NMCs. As mentioned above, in some embodiment, different observation ports may send duplicate network packets that are part of the same network communication. These packets may be considered duplicate because even though portions of the packet may be different (e.g., one or more header fields), the purpose or application payload of the packets may be the same.

At block 1004, in one or more of the various embodiments, the one or more NMCs may be arranged to identify one or more routers on the one or more monitored networks. In one or more of the various embodiments, NMCs may be arranged to monitored network traffic and identify protocols, applications, devices, or the like, based on one or more characteristics of the monitored network traffic. NMCs may employ one or more databases of protocol information to compare with monitored network traffic to identify the role of devices based on the network protocols they may use. Also, in one or more of the various embodiments, NMCs may be arranged to identify entities (e.g., including routers) in the network.

At block 1006, in one or more of the various embodiments, the one or more NMCs may be arranged to identify one or more authoritative observation ports. The NMC may be arranged to employ a network monitoring engine to determine which observation ports should be considered authoritative observation ports. Briefly, the NMC may be arranged to use static configuration information, rules, heuristics, or the like, or combination thereof to identify observation ports or authoritative observation ports based on monitoring network traffic in the network.

At block 1008, in one or more of the various embodiments, the one or more NMCs may be arranged to de-duplicate some or all of the monitored network traffic based on the one or more authoritative observation ports. As discussed in more detailed elsewhere herein, NMCs may be arranged to de-duplicate network traffic based on the observation port that provides the network traffic to the NMC.

In one or more of the various embodiments, network packets that are unassociated with an authoritative observation port may be identified and processed according to one or more defined policies. For example, in some embodiments, if network packets provided to an NMC are provided by an observation port that is not the authoritative observation port, the NMC may be configured to discard network packets.

At block 1010, in one or more of the various embodiments, some or all of the de-duplicated network traffic may be provided to an analysis engine for further processing. After the network traffic is de-duplicated, NMCs may be arranged to provide the remainder to analysis engines that may be arranged to further process the network to apply one or more policies to the traffic. In one or more of the various embodiments, this may improve operational performance by reducing or elimination double-counting of duplicate network traffic because the duplicate traffic does not require processing by the analysis engine. And, in one or more of the various embodiments, the metrics produced by the analysis engine may be more accurate because the duplicate traffic will not interfere. Next, control may be returned to a calling process.

Figure 11:
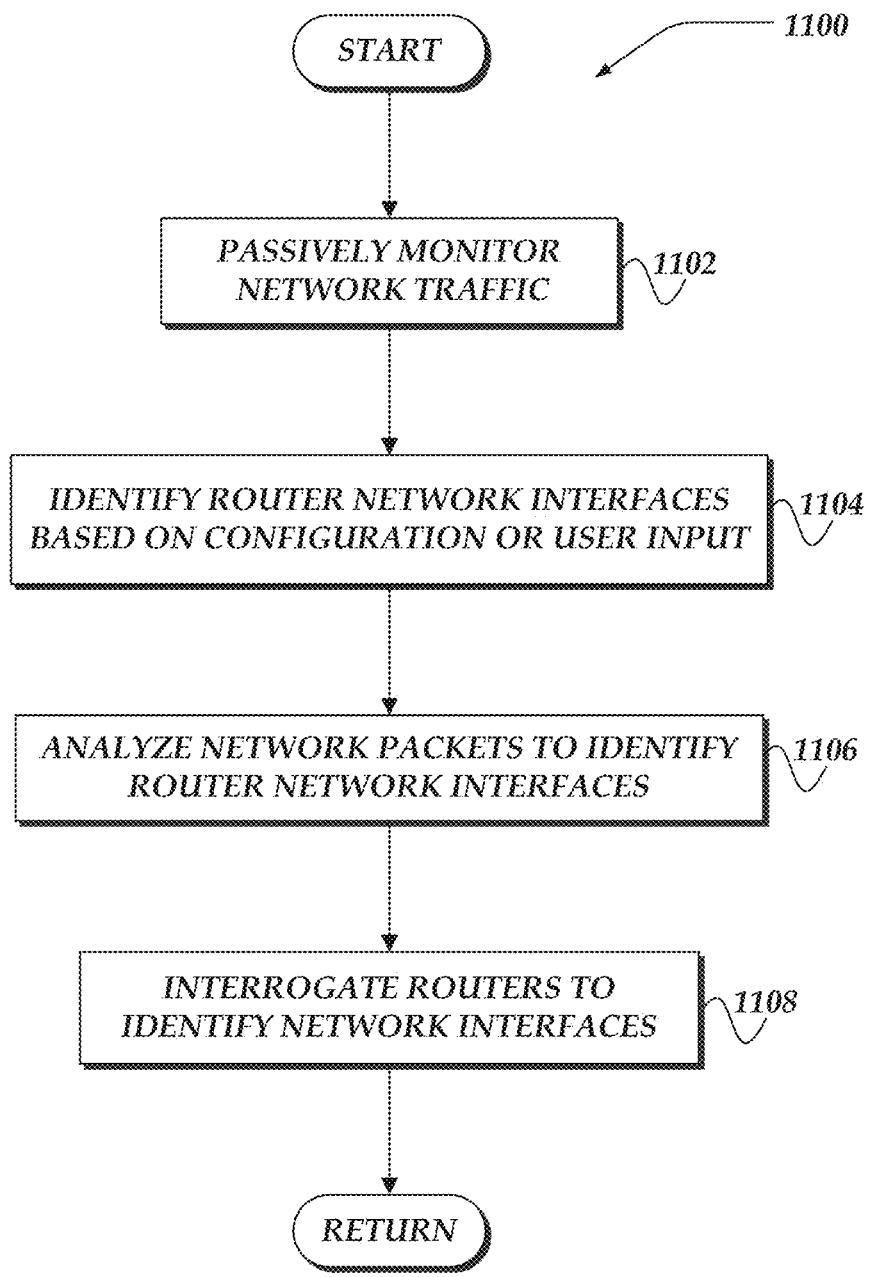
FIG. 11 illustrates an flowchart of a process for identifying routers or router interfaces in a network for network packet de-duplication in accordance with one or more of the various embodiments.

FIG. 11 illustrates an flowchart of process 1100 for identifying routers or router interfaces in a network for network packet de-duplication in accordance with one or more of the various embodiments. In one or more of the various embodiments, routers or router interfaces may be associated with specific observation ports.

After a start block, at block 1102, in one or more of the various embodiments, one or more NMCs may be arranged to monitor some or all network traffic for one or more networks. As described above, NMCs may be provided network traffic from one or more observation ports in one or more monitored networks. As mentioned above, the provided network traffic may be mirrored copies of the network traffic that is flowing through a monitored network.

At block 1104, in one or more of the various embodiments, the one or more NMCs may be arranged to use monitored network traffic to identify one or more router network interfaces based on configuration information or user input. In one or more of the various embodiments, NMCs may be arranged to include a network monitoring engine, such as, network monitoring engine 322 to examine the monitored network traffic to identify one or more network interfaces that may be associated with one or more routers. Herein and throughout this documents, routers may be described as a singular device even though they may actually have two or more network interfaces. For example, a minimum configuration router may include one ingress network interface and one egress network interface. Accordingly, in one or more of the various embodiments, the NMC may be arranged to identify network interfaces that may be associated with routers.

In one or more of the various embodiments, the NMCs may be arranged to employ predefined configuration information that identifies which network interfaces are associated with routers. For example, an NMC may be loaded with a table of information, such as MAC addresses, or the like, that are identified as routers or router interfaces. Also, in some embodiments, the NMCs may be arranged to provide a user interface that enable users to select or otherwise identify entities in the monitored network as being routers or router network interfaces.

In one or more of the various embodiments, NMCs may be arranged to access network configuration, such as, route tables, or the like, that may be used to identify routers or router interfaces, or the like. Further, in some embodiments, the NMC may be arranged to access network information from one or more other sources, such as a configuration management database, via one or more APIs.

At block 1106, in one or more of the various embodiments, the one or more NMCs may be arranged to analyze some or all of the monitored network traffic to identify one or more router network interfaces. In one or more of the various embodiments, NMCs may be arranged to employ the network monitoring engines to execute various rules, heuristics, evaluators, or the like, to identify routers or router interfaces.

In one or more of the various embodiments, the NMCs may be arranged to identify routers based on one or more characteristics of monitored network traffic. In some embodiments, NMCs may be arranged to identify network traffic that exhibits behavior or otherwise appears to have been provided by a router. For example, in one or more of the various embodiments, an NMC may be arranged to detect network traffic that has its source/destination address modified as it passes through a device in the network. Accordingly, in some embodiments, if the level of this behavior exceeds a defined or configured threshold, the NMCs may be arranged to consider that the involved network interfaces are router interfaces.

Thus, in one or more of the various embodiments, NMCs may be arranged to identify interfaces that exhibit router-like behavior such as modifying or rewriting some or all of the header fields for some or all network traffic. Accordingly, in one or more of the various embodiments, NMCs may be enabled to identify router-like devices that may be unknown or unexpectedly present in the monitored networks.

In one or more of the various embodiments, NMCs may be arranged to analyze MAC addresses in monitored networks to extract or identify meaningful information such as make, model, or version of the device. Thus, in some cases, this information may be used to infer whether a device is a router or router interface. For example, in some embodiments, Organizationally Unique Identifiers (OUIs) included as part of MAC address may be looked up in a database to identifier vendor information of a device that may be used with other information to infer a device may be a router.

Additionally, in one or more of the various embodiments, information based on or associated with MAC addresses may be used to infer which network interfaces belong to the same router. For example, in some embodiments, routers may have multiple network interfaces each associated with a MAC address. In some environments, a router's network interfaces that are connected to different networks may have the same MAC address because there is no chance of address collision since the interfaces are one different sub-networks. In other examples, routers (or switches) may have two or more network interfaces on the same network or sub-network which would require different MAC addresses. Also, in some examples, some routers may be configured to use different MAC address for each interface whether they are on different networks or not.

Accordingly, an NMC may be configured to identify which interfaces are associated with a particular router. The particular configuration of MAC addresses used for multiple interfaces may vary depending on the manufacturers of the router or its configuration. For example, a router may have three interfaces with MAC addresses such as 0000.0ca8.1201, 0000.0ca8.1202, and 0000.0ca8.1203 where three MAC addresses are the same except for the last portion which are sequential. Thus, in this example, an NMC may be configured to infer that that three network interfaces are associated with the same router.

In one or more of the various embodiments, NMCs may be arranged to execute rules or heuristics that employ a combination of the monitored network characteristics and the vendor information to identify routers. For example, if devices are determined to be manufactured by well-known manufacturers of routers those devices may be considered to be router candidates. Thus, if additional defined conditions are met, such as, sending traffic that correlates to traffic it receives, the candidate router may be considered a router.

In one or more of the various embodiments, NMCs may be arranged to determine that devices may be routers based on observing network administration traffic, network configuration traffic, or the like. For example, in some embodiments, NMCs may be arranged to monitor Dynamic Host Configuration Protocol (DHCP) traffic to identify default router assignments or gateway assignments that are provided to DHCP clients by DHCP servers.

Further, in one or more of the various embodiments, NMCs may be arranged to monitor network traffic to identify devices that may be using dynamic routing protocols or adaptive routing protocols, such as, RIP, OSPF, IS-IS, IGRP/EIGRP, or the like. Some or all of these routing protocols may require routers to occasionally/periodically exchange or communicate update information over the monitored networks to other routers to enable dynamic or adaptive routing. Accordingly, in one or more of the various embodiments, NMCs may be arranged to identify some or all of these routing protocols and designate some or all of the devices using such routing protocols as routers.

At block 1108, in one or more of the various embodiments, the one or more NMCs may be arranged to interrogate one or more routers to identify one or more router network interfaces. In one or more of the various embodiments, NMCs may be arranged to employ a network monitoring engine to actively query some or all devices on the network to determine if they are routers or router interfaces. In one or more of the various embodiments, various devices in the network may support one or more protocols, such as, Simple Network Management Protocol (SNMP), or the like, that may be arranged to report information about a given device that may indicate whether it is a router.

Accordingly, in one or more of the various embodiments, NMCs may be arranged to execute configured scripts or programs that probe one or more discovered interfaces as part of determining if interfaces are associated with router devices. For example, in one or more of the various embodiments, an NMC may be arranged to emit network packets having known headers and payload on one side of an interface or in one part of the network and compare the headers and payload of the those packets on the other side of the interface or in another part of the network. Next, control may be returned to a calling processing.

Figure 12:
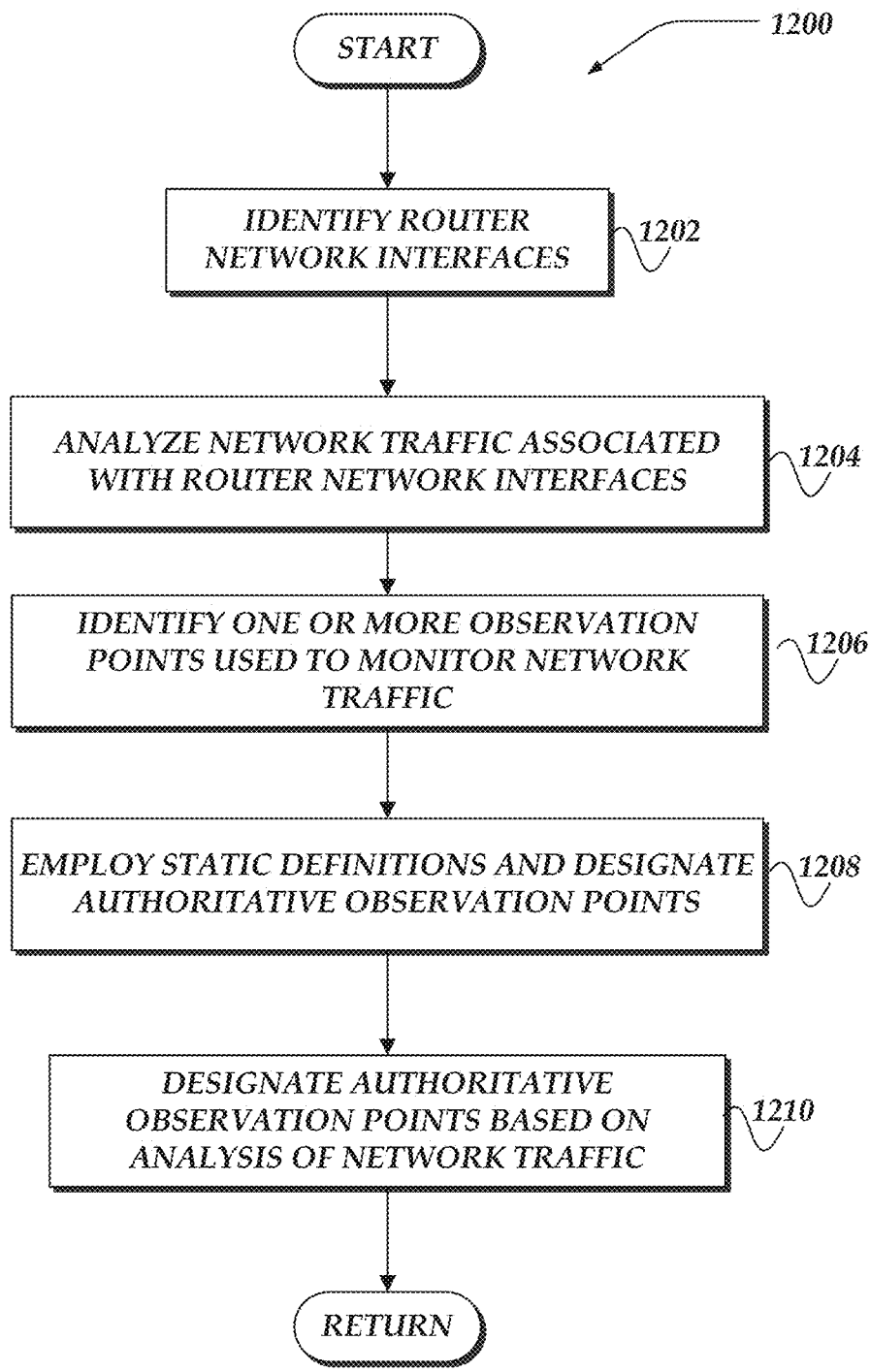
FIG. 12 illustrates an flowchart of a process for identifying authoritative observation ports for network packet de-duplication in accordance with one or more of the various embodiments.

FIG. 12 illustrates an flowchart of process 1200 for identifying authoritative observation ports for network packet de-duplication in accordance with one or more of the various embodiments. After a start block, at block 1202, in one or more of the various embodiments, one or more NMCs may be arranged to identify one or more router network interfaces. As described above, NMCs may be arranged to employ one or more network monitoring engines to identify one or more routers in one or more monitored networks. In some embodiments, one or more of the identified routers may be associated with observation ports that provide monitored network traffic to the one or more NMCs.

At block 1204, in one or more of the various embodiments, the one or more NMCs may be arranged to analyze network traffic that may be associated with the one or more router interfaces. In one or more of the various embodiments, NMCs may be arranged collect various measurements for the network traffic that may be associated with the one or more router interfaces. In one or more of the various embodiments, because NMCs may be arranged to detect and track the state transitions associated with one or more communication protocols or application protocols, they may discern client request traffic from server response traffic. Also, in one or more of the various embodiments, by NMCs may be arranged to associate timestamps with observed network packets. Accordingly, in some embodiments, the NMCs may measure or otherwise time data associated with duplicate network packets observed in the monitored networks.

In one or more of the various embodiments, NMCs may be arranged to collect various metrics such as hop counts, time to live (TTL) values, latency values, or the like, that may be used to compare duplicate network packets.

In one or more of the various embodiments, NMCs may be arranged to track one or more metrics on a per network flow basis to enable duplicate packets associated with the same network to be compared or measured. Also, in some embodiments, NMCs may be arranged to track connections that may comprise bi-directional network flows that are associated with network traffic in two directions (e.g., send/receive).

In one or more of the various embodiments, NMCs may be arranged to track unidirectional network flows. For example, a network flow associated with client requests may be tracked separately from a network flow that carries server responses to for a given client. In one or more of the various embodiments, the communication protocols (or application protocols) may determine the lifetime of network flows or their direction, as well as if there may be one or more related network flows.

In one or more of the various embodiments, defined rules or conditions may be employed by the NMC to compute metrics or characteristics of network traffic, network flows, or network packets. In one or more of the various embodiments, one or more metrics may be collected at-face-value, such as, traffic volume, bit rates, various counters (e.g., error counters, or the like), latency measurements, or the like. Further, in some embodiments, one or more metrics may be computed based on one or more measured metrics or conditions. Also, in one or more of the various embodiments, one or more metrics may be classifications, such that network traffic or network flows may be assigned various classifications or categories values if one or more defined conditions are met.

At block 1206, in one or more of the various embodiments, the one or more NMCs may be arranged to identify one or more observation ports used for monitoring network traffic in the one or more networks. In one or more of the various embodiments, the metrics or characterizations determined previously may be employed to identify one or more observation ports. As discussed above, in many cases, observation ports may be associated with routers in the monitored networks.

Further, in one or more of the various embodiments, observation ports may be associated with particular network flows. Accordingly, in some embodiments, one or more network flows may be associated with different observation ports depending on their traffic characteristics, including the path they may take through monitored networks. In some embodiments, two or more network flows for communication between the same endpoints may be associated different observation ports depending on the path their network traffic takes through the network.

In one or more of the various embodiments, as discussed above, the same network flow may be associated with two or more observation ports. In one or more of the various embodiments, this may occur if network traffic associated with the same network flow is observed at more than one observation port. As mentioned above, for some embodiments, having more than one observation port associated with a network flow may cause duplicate network packets to be provided to the NMC.

Further, in some embodiments, changes in network conditions may cause the network traffic for one or more network flows to be re-routed. In some embodiments, re-routing network flows in a network may cause network flows to be associated with different observation ports. Accordingly, in one or more of the various embodiments, NMCs may be arranged to detect flow re-routing and update internal tables that map observation ports to network flows as necessary.

At block 1208, in one or more of the various embodiments, the one or more NMCs may be arranged to employ static definitions to designate one or more authoritative observation ports. In one or more of the various embodiments, NMCs may be arranged to employ pre-defined configuration information that indicates one or more observation ports as being authoritative observation ports. In one or more of the various embodiments, such configuration information may include a list or database of one or more known observation ports. Accordingly, in some embodiments, each observation port may be associated with rules or conditions that prescribe if an observation port should be considered an authoritative observation port for various network traffic or network flows.

For example, in one or more of the various embodiments, NMCs may be arranged to include a record of routers or router interfaces identified by their MAC addresses. Each router or router interface record may be associated with one or more rules that define one or more types of network traffic the router should be considered as the authoritative observation port. Likewise, in some embodiments, configuration information may include characteristics, such as, traffic source, traffic destination, traffic rate, packet size, application source, application destination, or the like, that may be used to define rules for assigning authoritative observation ports to particular network flows.

In one or more of the various embodiments, the configuration information may include definitions that indicate one or more observation ports should be authoritative observation ports for network flows that have one or more characteristics. For example, in some embodiments, static configuration may indicate that a particular observation port should be authoritative for network traffic associated with one or more applications. Similarly, in some embodiments, rules in the static configuration may assign authoritative observation ports based on some or all of the tuple information associated with a network flow. For example, in one or more of the various embodiments, NMCs may be arranged use a particular observation port as an authoritative observation port for network traffic originating from a particular source network address. Likewise, for example, NMCs may employ static configuration information to define an observation port as the authoritative observation port for network traffic associated with a particular TCP port, or the like.

Also, in one or more of the various embodiments, NMCs may be arranged to employ rules included configuration information to define authoritative observation ports based on higher level characteristics of the traffic, such as application type (e.g., databases, web servers, LDAP servers, name services, or the like), traffic related to errors/error handling, transaction type (e.g., requests, responses, security related transactions, payment transactions, or the like.

At block 1210, in one or more of the various embodiments, the one or more NMCs may be arranged to designate one or more authoritative observation ports based on an analysis of some or all of the monitored network traffic. In one or more of the various embodiments, while in some aspect these actions may be similar to those described for block 1208, it refers NMCs that may be arranged to dynamically select observation ports that may be authoritative observation ports for various types of network traffic. Accordingly, in some embodiments, NMCs may be arranged to select observation ports to match with network traffic. In one or more of the various embodiments, in some embodiments, authoritative observation ports may be assigned on a per network flow basis. Thus, in one or more of the various embodiments, different network flows that may have the same type of network traffic may be assigned different authoritative observation ports. In contracts, some static assignments, where a given observation port may be assigned to be authoritative to all network flows associated with a particular type of network traffic—as defined by one or more rules.

In one or more of the various embodiments, NMCs may be arranged to execute one or more rules on a per network flow basis or per connection basis (e.g., bi-directional network flows) to assign an authoritative observation port with a given network flow or network connection.

In one or more of the various embodiments, NMCs may be arranged to assign authoritative observation ports based on one or more characteristics of the network or network traffic associated with a given network flow. In one or more of the various embodiments, characteristics of related to the network flow performance metrics as well as content characteristics of the network flow may be employed to assign its authoritative observation port. In one or more of the various embodiments, as discussed above, configuration information that includes rules or conditions may be employed by NMCs to assign authoritative observation ports to network flows. For example, in some embodiments, an authoritative observation port for a network flow may be determined based on an observation port's distance from an observed network flow as determined by comparing latency or timestamp information of duplicate network packets provided by different observation ports. As described throughout this applications, NMCs may be arranged to execute various rules or heuristics to assign authoritative observation ports to network flows.

Also, in one or more of the various embodiments, NMCs may be arranged to dynamically assign authoritative observation ports based on changes one or more monitored or computed metrics. In some embodiments, configuration information used by NMCs may include one or more rules that select new or different authoritative observation ports if one or more characteristics of the network change.

For example, in one or more of the various embodiments, in a distributed cloud computing environment, additional or different computing resources may be provisioned or de-provisioned based on user load or one or more user characteristics (e.g., user location). Accordingly, in this example, as computing resources are allocated or reallocated, NMCs may be arranged to automatically assign or re-assign authoritative observation ports to account for the update arrangement of resources in a network.

Likewise, in one or more of the various embodiments, system administrators may manually re-configure one or more monitored networks such that one or more characteristics of the monitored network traffic change. Accordingly, in one or more of the various embodiments, NMCs may be arranged to automatically assign or re-assign authoritative observation ports to account for changes in network configuration made be system administrators.

For example, in one or more of the various embodiments, NMCs may be arranged to periodically evaluate its current set of authoritative observation ports to determine they remain qualified to be authoritative observation ports based on configuration information that includes various rules of conditions. Note, in one or more of the various embodiments, the rules or conditions for re-assigning authoritative observation ports may be different than the rules or conditions initially used to assign the authoritative observation ports. Next, in one or more of the various embodiments, control may be returned to a calling process.

Figure 13:
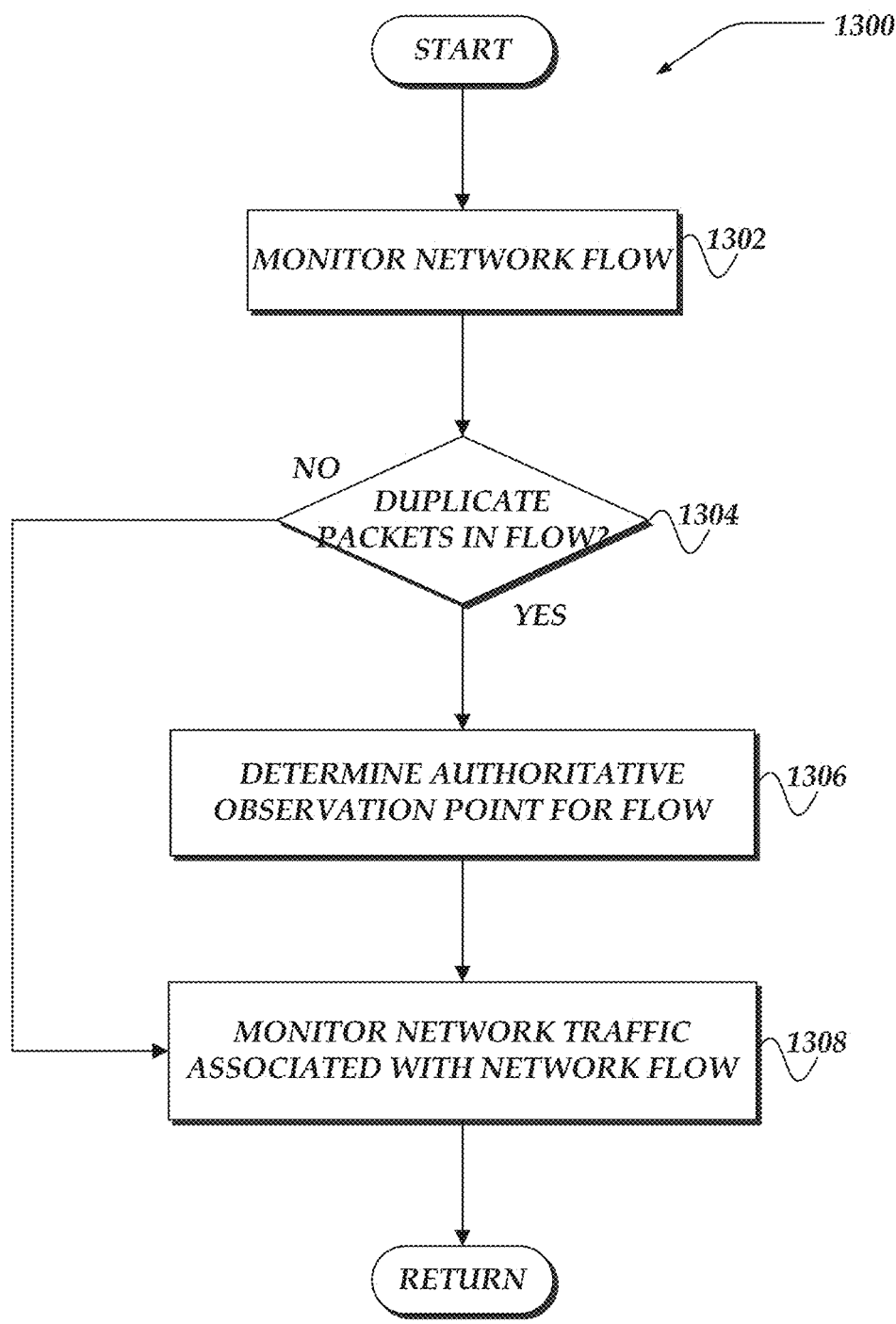
FIG. 13 illustrates a flowchart of a process for network packet de-duplication in a monitored network flow accordance with one or more of the various embodiments.

FIG. 13 illustrates a flowchart of process 1300 for network packet de-duplication in a monitored network flow accordance with one or more of the various embodiments. After a start block, at block 1302, in one or more of the various embodiments, the one or more NMCs may be arranged to monitor one or more network flows. As described above, one or more NMCs may be arranged to receive monitored network traffic provided by one or more observation ports. In some embodiments, the one or more observation ports may be associated with routers or other devices that may produce duplicate network packets.

In one or more of the various embodiments, NMCs may be arranged to group or associate network traffic into network flows based on one or more characteristics such as tuple information. Accordingly, in one or more of the various embodiments, NMCs may be arranged to monitor network flows that are associated with a portion of the monitored network traffic.

In one or more of the various embodiments, NMCs may be arranged to employ a network monitoring engine, such as network monitoring engine 322, or the like, to track one or more observed network flows and to associate various monitored metrics with the one or more network flows.

At decision block 1304, in one or more of the various embodiments, if the one or more NMCs identifies one or more duplicate network packets in the monitored network flows, control may flow to block 1306; otherwise, control may flow to block 1308.

At block 1306, in one or more of the various embodiments, the one or more NMCs may be arranged to designate one or more authoritative observation ports for the one or more monitored network flows. As described herein, NMCs may be arranged to execute one or more rules, or the like, to assign authoritative observation port to a given network flow based on monitored metrics or characteristics of the network flows.

At block 1308, in one or more of the various embodiments, the one or more NMCs may be arranged to monitor some or all of the network traffic associated with the one or more network flows. As described above, NMCs may be arranged to monitor network traffic and apply one or more rules to one or more network flows based on information or metrics gathered during the monitoring of network traffic associated with the one or more network flows. Next, control may be returned to a calling process.

Figure 14:
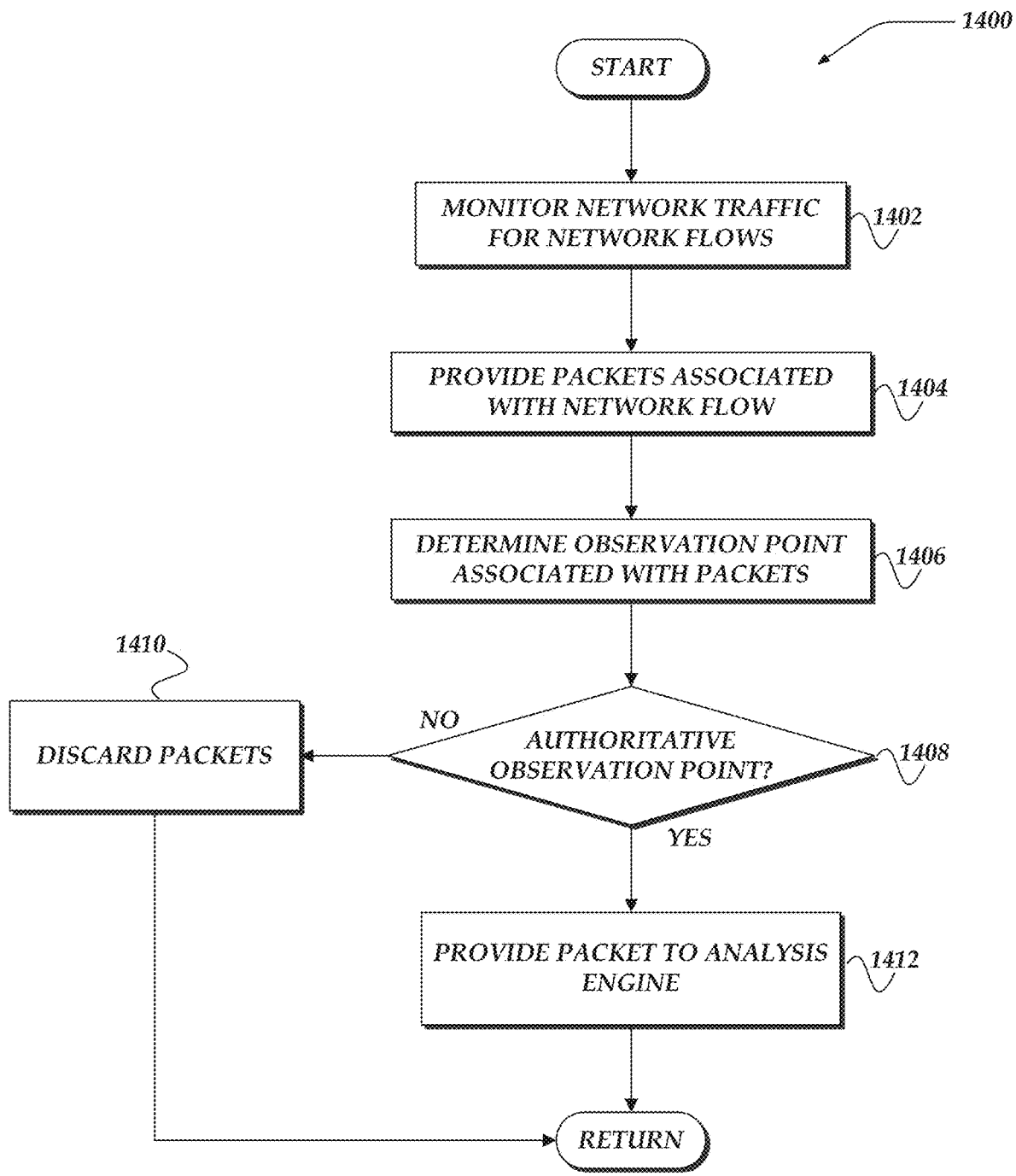
FIG. 14 illustrates a flowchart of a process for using authoritative observation ports for network packet de-duplication in accordance with one or more of the various embodiments.

FIG. 14 illustrates a flowchart of process 1400 for using authoritative observation ports for network packet de-duplication in accordance with one or more of the various embodiments. After a start block, at block 1402, in one or more of the various embodiments, one or more NMCs may be arranged to monitor network traffic for one or more network flows. As described above, NMCs may be monitor network traffic and identify various network flows. Accordingly, in one or more of the various embodiments, network flows may be monitored by monitoring the network traffic that may be associated with the monitored network flows. In one or more of the various embodiments, NMCs may be associated to identify network flows or associate network traffic with network flows based on tuple information included in the network packets that comprise the network traffic. Accordingly, in one or more of the various embodiments, NMCs may be arranged to collect metrics and determine one or more characteristics of a network flow based on monitored the network traffic that may be associated with the network flow.

At block 1404, in one or more of the various embodiments, the one or more NMCs may be arranged to provide one or more network packets associated with the one or more monitored network flows to a network monitoring engine. As described above, network packets that comprises the monitored network traffic may be associated with the one or more network flows.

At block 1406, in one or more of the various embodiments, the one or more NMCs may be arranged to identify one or more observation ports that may be associated with the one or more network packets. In one or more of the various embodiments, NMCs may be arranged to determine which observation port provided the one or more network packet.

In one or more of the various embodiments, the NMCs may map the source MAC address included in a network packet to a known observation port. Accordingly, in some embodiments, one or more of network packets provided to a NMCs may be a mapped to the observation port that provided the packet to the NMC. Note, in one or more of the various embodiments, as discussed above, some of the one or more network packets may be duplicate network packets associated with the same network flow but provided by different observation ports.

At decision block 1408, in one or more of the various embodiments, if the observation port associated with the one or more network packets may be authoritative observation ports, control may flow to block 1412; otherwise, control may flow to block 1410. As described above, in one or more of the various embodiments, NMCs may be arranged identify or designate an authoritative observation port for a given network flow. Accordingly, in one or more of the various embodiments, NMCs may be arranged to compare the identity of the observation port that provided a given network packet for a network flow with that network flow's designated authoritative observation port.

At block 1410, in one or more of the various embodiments, because one or more of the provided network packets are unassociated with an authoritative observation port, the one or more NMCs may be arranged to discard or otherwise disregard the one or more duplicate network packets. Note, in one or more of the various embodiments, some network packets may be discarded even though they are not strictly speaking duplicates. In some embodiments, NMCs may be arranged to discard network packets simply because they were provided to the NMC by a non-authoritative observation port. For example, in some embodiments, a NMC may be first provided one or more network packets from a non-authoritative observation port. Accordingly, in this example, these network packets may be discarded even though network packets from an authoritative observation port have yet to be provided to the NMC. Next, control may be returned to a calling process.

At block 1412, in one or more of the various embodiments, the one or more NMCs may be arranged to provide the one or more network packets to an analysis engine. In one or more of the various embodiments, if the duplicate network packets for a network flow have been discarded or otherwise disregarded, the remaining network packets may be provided to an analysis engine, such as, analysis engine 324 for further processing. Accordingly, in one or more of the various embodiments, the analysis engine may be arranged to collect or compute metrics for the one or monitored network flows based on the remaining network packets (non-duplicates). Also, in one or more of the various embodiments, one or more rules or policies may be applied to the monitored network traffic or network flows based on the non-duplicative network packets.

In one or more of the various embodiments, this may improve monitoring performance on NMCs by excluding duplicate network packets from being processed by the analysis engine. Likewise, in one or more of the various embodiments, excluding duplicate network packets from being processed by the analysis engine may improve the veracity, accuracy, or correctness of one or more monitoring results by reducing or eliminating false positives that may be caused by counting duplicate network packets or measuring network traffic characteristics associated with duplicate network packets. Next, control may be returned to a calling process.

Figure 15:
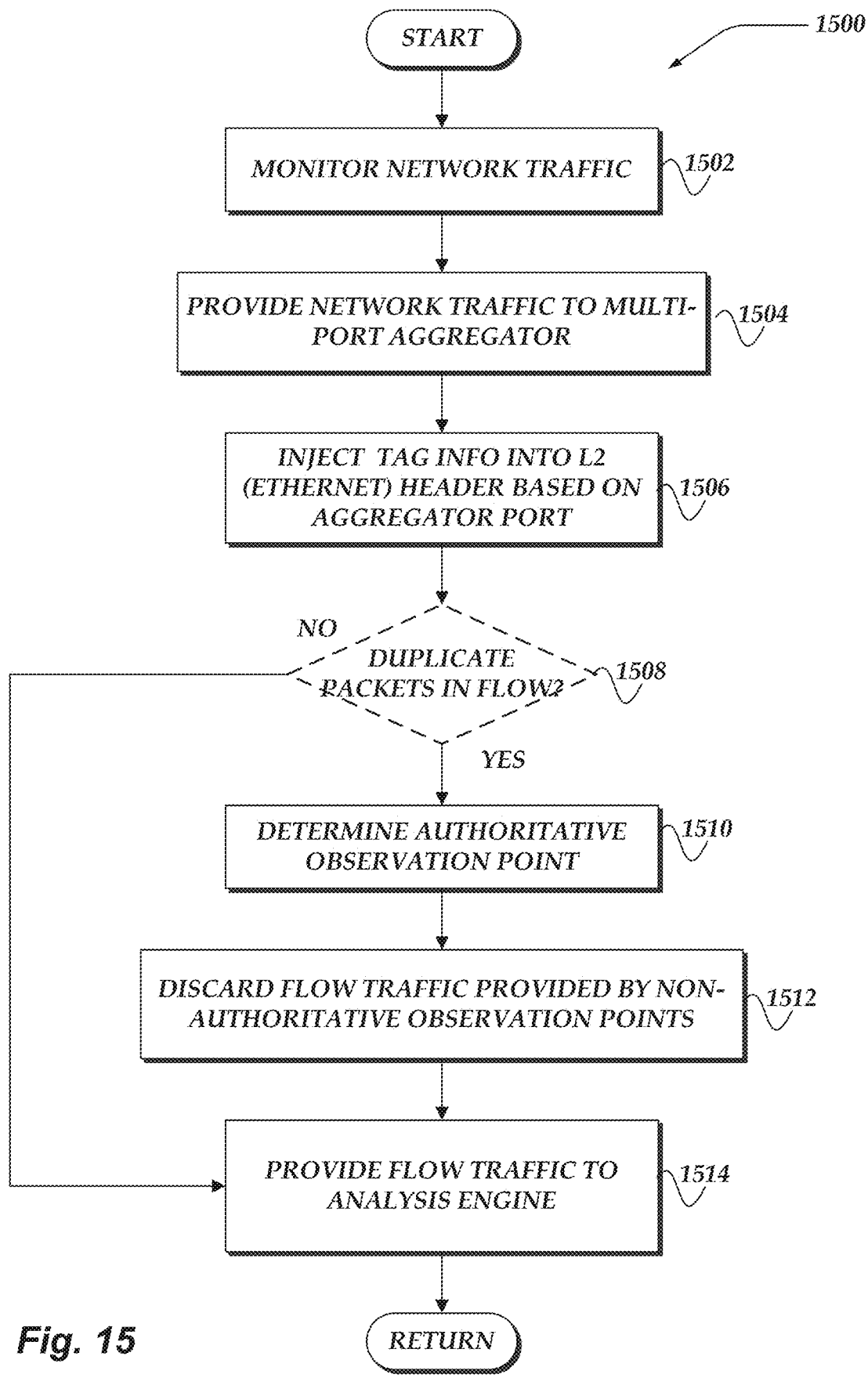
FIG. 15 illustrates a flowchart of a process for Open System Interconnection (OSI) Layer 2 network packet de-duplication in accordance with one or more of the various embodiments.

FIG. 15 illustrates a flowchart of process 1500 for Open System Interconnection (OSI) Layer 2 network packet de-duplication in accordance with one or more of the various embodiments. After a start block, at block 1502, in one or more of the various embodiments, one or more NMCs may be arranged to monitor network traffic. As described above, an NMC may be arranged to monitor network traffic that is being communicated over different portions of a network.

At block 1504, in one or more of the various embodiments, the network traffic may be provided to a multiport aggregators, such as multiport Switch Port Analyzers (SPAN) aggregators or multiport Test Access Port (TAP) aggregators. As described above, in some embodiments, network switches or routers may be arranged to employ SPAN ports or TAP ports that passively provide copies of wire network traffic to NMCs. In some cases, switches or routers may include multiple port aggregators that collect network traffic from more than one port and provide it in one aggregated stream to an NMC.

In one or more of the various embodiments, NMCs may be arranged to provide their own (built-in) multiport aggregators. In other embodiments, switches or routers external to the NMCs may provide the multiport aggregators.

At block 1506, in one or more of the various embodiments, the one or more NMCs or the multiport aggregators may be arranged to inject tag information into Open System Interconnection (OSI) Layer 2 header fields of one or more network packets based on the particular port that provided the network traffic to the multiport aggregator. In one or more of the various embodiments, each port of multiport aggregator may be assigned tag information that may identified the port the initially provides the network traffic that may be aggregated.

Accordingly, in one or more of the various embodiments, network packets may be injected with tag information that may be used to identify the port that may be associated with the network traffic. For example, in some embodiments, a multiport aggregator may be arranged or configured to insert VLAN tag information into packets as they are aggregated into a common stream. As described above, referring to FIG. 9, a multiport SPAN aggregator may be arranged to inject tag information into fields 910 (e.g., TPI and TAG field) that correspond to the SPAN port that provides to the network packets to the one or more NMC.

In one or more of the various embodiments, injecting tag information, such as VLAN tag information, into network packets may be a well-known feature built-in to some multi-port SPAN aggregators. In other cases, for some embodiments, custom multi-port SPAN aggregators may be create that use customized hardware or software components to inject tag information into network packets that are provided to each individual port.

At decision block 1508, optionally, in one or more of the various embodiments, if the existence of duplicate network packets are discovered in the monitored network flows, control may flow to block 1510; otherwise, control may flow to block 1514. In one or more of the various embodiments, as described above, NMCs may be arranged to compare network packets to identify if they are duplicates.

In one or more of the various embodiments, this optional comparison may use low-impact comparison methods based on heuristics, or the like, to determine if there may be a likelihood of duplicates packets. In some embodiments, NMCs may be arranged to occasionally sample monitored traffic to see if there may be duplicate traffic occurring in the monitored network flows. Accordingly, in one or more of the various embodiments, NMCs may be arranged to avoid other more expensive de-duplication actions until there is some evidence that duplicate packets are being seen.

Note, decision block 1508 is indicated as being optional, because, in some embodiments, NMCs may omit this step. If so, control may flow straight to block 1510 for further processing.

At block 1510, in one or more of the various embodiments, the one or more NMCs may be arranged to determine one or more authoritative observation ports that may be associated with the monitored network flows. In one or more of the various embodiments, the one or more NMCs may be arranged to assign one port (e.g., a SPAN port) as the authoritative observation port for one or more network flows being monitored by the one or more NMCs. In some embodiments, the particular mapping or assignment of ports to be authoritative observation ports for network flows may be assigned using rules or configuration information as described above for assigning authoritative observation ports.

At block 1512, in one or more of the various embodiments, the one or more NMCs may be arranged to discard or disregard one or more network packets from the monitored network flows provided by non-authoritative observation ports. In one or more of the various embodiments, NMCs may employ the injected tag information to identify which port of the multi-port SPAN aggregator provided each network packet each network packet. Accordingly, in one or more of the various embodiments, if network packets include tag information associated with a non-authoritative ports, they may be discarded or otherwise disregarded.

At block 1514, in one or more of the various embodiments, the one or more NMCs may be arranged to provide the one or more network packets to an analysis engine for further processing. In one or more of the various embodiments, network traffic provided via authoritative observation ports may be provided to the analysis for further processing or analysis.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for monitoring network traffic over a network, wherein one or more processors in one or more network monitoring computers (NMCs) execute instructions to perform actions, comprising:
    employing a plurality of observation ports to monitor one or more flows of network packets based on one or more of a characteristic of an observation port or a characteristic of a network packet monitored by the observation port;
    employing the plurality of observation ports to determine one or more authoritative observation ports, wherein one or more of the monitored network packets associated with the one or more authoritative observation ports is identified as one or more primary network packets;
    changing identification of an observation port as authoritative to a different observation port based on one or more observed changes in the one or more characteristics of the one or more flows of network packets; and
    providing information for the one or more flows based on the one or more primary network packets.

2. The method of claim 1, wherein determining the one or more authoritative observation ports further comprises employing one or more of static configuration information, dynamic configuration information, heuristics, or rules.

3. The method of claim 1, further comprising one or more of:
    discarding the one or more monitored network packets unassociated with the one or more authoritative observation ports; or
    identifying as duplicative the one or more monitored network packets unassociated with the one or more authoritative observation ports.

4. The method of claim 1, wherein the provided information is employed to perform one or more further actions including:
    applying one or more policies to reduce double counting of duplicative monitored network packets for the one or more flows; or
    providing metrics for the one or more flows based on non-duplicative monitored network packets.

5. The method of claim 1, further comprising:
    employing the monitored network packets to identify one or more devices on a network that operate as a router or provide a router interface.

6. The method of claim 1, wherein employing the plurality of observation ports to monitor the one or more flows of network packets further comprises:
    determining one or more of the plurality of observation ports based on an association of the observation port with a flow based on a path used by one or more of the monitored network packets.

7. A system for monitoring network traffic over a network between one or more computers comprising:
    one or more network monitoring computers (NMCs), comprising:
        a memory that stores at least instructions; and
        one or more processors that execute instructions that perform actions, including:
            employing a plurality of observation ports to monitor one or more flows of network packets based on one or more of a characteristic of an observation port or a characteristic of a network packet monitored by the observation port;
            employing the plurality of observation ports to determine one or more authoritative observation ports, wherein one or more of the monitored network packets associated with the one or more authoritative observation ports is identified as one or more primary network packets;

changing identification of an observation port as authoritative to a different observation port based on one or more observed changes in the one or more characteristics of the one or more flows of network packets; and providing information for the one or more flows based on the one or more primary network packets.

8. The system of claim 7, wherein determining the one or more authoritative observation ports further comprises employing one or more of static configuration information, dynamic configuration information, heuristics, or rules.

9. The system of claim 7, further comprising one or more of:

discarding the one or more monitored network packets unassociated with the one or more authoritative observation ports; or identifying as duplicative the one or more monitored network packets unassociated with the one or more authoritative observation ports.

10. The system of claim 7 wherein the provided information is employed to perform one or more further actions including:

applying one or more policies to reduce double counting of duplicative monitored network packets for the one or more flows; or providing metrics for the one or more flows based on non-duplicative monitored network packets.

11. The system of claim 7, further comprising:

employing the monitored network packets to identify one or more devices on a network that operate as a router or provide a router interface.

12. The system of claim 7, wherein employing the plurality of observation ports to monitor the one or more flows of network packets further comprises:

determining one or more of the plurality of observation ports based on an association of the observation port with a flow based on a path used by one or more of the monitored network packets.

13. A processor readable non-transitory storage media that includes instructions for monitoring network traffic over a network between one or more computers, wherein execution of the instructions by one or more processors on one or more network monitoring computers (NMCs) performs actions, comprising:

employing a plurality of observation ports to monitor one or more flows of network packets based on one or more of a characteristic of an observation port or a characteristic of a network packet monitored by the observation port;

employing the plurality of observation ports to determine one or more authoritative observation ports, wherein one or more of the monitored network packets associated with the one or more authoritative observation ports is identified as one or more primary network packets;

changing identification of an observation port as authoritative to a different observation port based on one or more observed changes in the one or more characteristics of the one or more flows of network packets; and providing information for the one or more flows based on the one or more primary network packets.

14. The processor readable non-transitory storage media of claim 13, wherein determining the one or more authoritative observation ports further comprises employing one or more of static configuration information, dynamic configuration information, heuristics, or rules.

15. The processor readable non-transitory storage media of claim 13, further comprising one or more of:

discarding the one or more monitored network packets unassociated with the one or more authoritative observation ports; or identifying as duplicative the one or more monitored network packets unassociated with the one or more authoritative observation ports.

16. The processor readable non-transitory storage media of claim 13, wherein the provided information is employed to perform one or more further actions including:

applying one or more policies to reduce double counting of duplicative monitored network packets for the one or more flows; or providing metrics for the one or more flows based on non-duplicative monitored network packets.

17. The processor readable non-transitory storage media of claim 13, further comprising:

employing the monitored network packets to identify one or more devices on a network that operate as a router or provide a router interface.

* * * * *